US007566269B2

(12) United States Patent
B-Jensen et al.

(10) Patent No.: US 7,566,269 B2
(45) Date of Patent: Jul. 28, 2009

(54) GAMING DEVICE HAVING SELECTABLE AWARDS ON A MOVING MECHANICAL DISPLAY

(75) Inventors: Janna D. B-Jensen, Reno, NV (US); Cari L. Blomquist, Reno, NV (US); Randall D. Mead, Reno, NV (US); Megan N. Schlegel, Reno, NV (US); Melvin J. Hawes, Reno, NV (US); Jamie J. Goins, Reno, NV (US); Andrea C. Hughs-Baird, Reno, NV (US)

(73) Assignee: IGT, Reno, NV (US)

( * ) Notice: Subject to any disclaimer, the term of this patent is extended or adjusted under 35 U.S.C. 154(b) by 501 days.

(21) Appl. No.: 10/953,714

(22) Filed: Sep. 29, 2004

(65) Prior Publication Data

US 2006/0073872 A1 Apr. 6, 2006

(51) Int. Cl.
*A63F 13/00* (2006.01)

(52) U.S. Cl. ............................ 463/20; 463/16; 463/30; 273/138.1; 273/138.2; 273/141 R

(58) Field of Classification Search .................... 463/1, 463/16, 19–20, 30–34; 273/138.1, 138.2, 273/141 R, 141 A, 143 A, 142 B, 142 C
See application file for complete search history.

(56) References Cited

U.S. PATENT DOCUMENTS

| | | | |
|---|---|---|---|
| 1,978,395 | A | 4/1934 | Groetchen |
| 2,545,644 | A | 3/1951 | Benton et al. |
| 3,420,525 | A | 1/1969 | Waders |
| 3,642,287 | A | 2/1972 | Lally et al. |
| 3,735,987 | A | 5/1973 | Ohki |
| 3,975,022 | A | 8/1976 | Figueroa |

(Continued)

FOREIGN PATENT DOCUMENTS

| | | |
|---|---|---|
| AU | 199650720 | 10/1996 |

(Continued)

OTHER PUBLICATIONS

American Bandstand Brochure written by Anchor Games, published in 2001.

(Continued)

*Primary Examiner*—Peter DungBa Vo
*Assistant Examiner*—Arthur O. Hall
(74) *Attorney, Agent, or Firm*—K & L Gates LLP

(57) ABSTRACT

A gaming device having selectable awards on a moving mechanical display, such as a symbol display mechanism or an award display mechanism. In one embodiment, the gaming device includes an electromechanical secondary display device that is operable to rotate about an axis. The electromechanical secondary display device includes at least one and preferably a plurality of individual symbol display members. Each individual symbol display member is adapted to display at least one symbol or award. In operation, after determining the symbol, award or outcome displayed by each of the individual symbol display members, the electromechanical secondary display device rotates about an axis to indicate one of the individual symbol display members. The symbol or award displayed on the indicated symbol display member is provided to the player and the game ends.

26 Claims, 16 Drawing Sheets

U.S. PATENT DOCUMENTS 4,326,351 A 4/1982 Heywood et al.
4,410,178 A 10/1983 Partridge
4,448,419 A 5/1984 Telnaes
4,517,558 A 5/1985 Davids
4,695,053 A 9/1987 Vazquez, Jr. et al.
4,732,386 A 3/1988 Rayfiel
4,890,845 A * 1/1990 Gatewood ................... 273/271
4,978,129 A 12/1990 Komeda et al.
5,058,893 A 10/1991 Dickinson et al.
5,152,529 A 10/1992 Okada
5,188,363 A * 2/1993 Marnell et al. ................ 463/13
5,364,100 A 11/1994 Ludlow et al.
5,395,111 A 3/1995 Inoue
5,449,173 A 9/1995 Thomas et al.
5,560,603 A 10/1996 Seelig et al.
5,584,763 A 12/1996 Kelly et al.
5,584,764 A 12/1996 Inoue
5,609,524 A 3/1997 Inoue
5,664,998 A 9/1997 Seelig et al.
5,722,891 A 3/1998 Inoue
5,752,881 A 5/1998 Inoue
5,788,573 A 8/1998 Baerlocher et al.
5,823,872 A 10/1998 Prather et al.
5,823,874 A 10/1998 Adams et al.
5,827,119 A * 10/1998 Bromley ........................ 463/7
D400,597 S 11/1998 Hedrick et al.
D402,702 S 12/1998 Seelig et al.
5,848,932 A 12/1998 Adams
5,863,249 A 1/1999 Inoue
D406,865 S 3/1999 Heidel
5,882,261 A 3/1999 Adams
5,911,418 A 6/1999 Adams et al.
5,927,714 A 7/1999 Kaplan
5,947,820 A 9/1999 Morro et al.
5,976,015 A 11/1999 Seelig et al.
5,984,782 A 11/1999 Inoue
5,997,401 A 12/1999 Crawford
6,004,207 A 12/1999 Wilson, Jr. et al.
6,056,642 A 5/2000 Bennett
6,059,658 A 5/2000 Mangano et al.
6,086,066 A 7/2000 Takeuchi et al.
6,089,977 A 7/2000 Bennett
6,089,978 A 7/2000 Adams
6,105,962 A 8/2000 Malavazos et al.
6,113,098 A 9/2000 Adams
6,135,884 A 10/2000 Hedrick et al.
6,142,873 A 11/2000 Weiss et al.
6,142,874 A 11/2000 Kodachi et al.
6,159,098 A 12/2000 Slomiany et al.
6,162,121 A 12/2000 Morro et al.
6,168,520 B1 1/2001 Baerlocher et al.
6,173,955 B1 1/2001 Perrie et al.
6,174,234 B1 1/2001 Seibert et al.
6,174,235 B1 1/2001 Walker et al.
6,203,429 B1 3/2001 Demar et al.
D441,031 S 4/2001 Seelig et al.
6,213,876 B1 4/2001 Moore, Jr.
6,220,593 B1 4/2001 Pierce et al.
6,224,483 B1 * 5/2001 Mayeroff ..................... 463/20
6,227,970 B1 5/2001 Shimizu et al.
D443,313 S 6/2001 Brettschneider
6,251,013 B1 6/2001 Bennett
6,254,481 B1 7/2001 Jaffe
6,261,177 B1 7/2001 Bennett
6,267,669 B1 7/2001 Luciano, Jr. et al.
6,270,411 B1 8/2001 Gura et al.
6,270,412 B1 8/2001 Crawford
6,302,790 B1 10/2001 Brossard
6,305,686 B1 10/2001 Perrie et al.
6,312,334 B1 11/2001 Yoseloff
6,315,663 B1 11/2001 Sakamoto
6,334,814 B1 1/2002 Adams
6,336,863 B1 1/2002 Baerlocher et al.
6,340,158 B2 1/2002 Pierce et al.
6,368,216 B1 4/2002 Hedrick et al.
6,386,974 B1 5/2002 Adams
6,398,220 B1 6/2002 Inoue
6,419,579 B1 7/2002 Bennett et al.
6,461,241 B1 10/2002 Webb et al.
D465,531 S 11/2002 Luciano, Jr. et al.
6,481,713 B2 11/2002 Perrie et al.
6,491,296 B2 * 12/2002 Kelly et al. ............. 273/118 A
6,517,432 B1 2/2003 Jaffe
6,533,273 B2 3/2003 Cole et al.
6,533,660 B2 3/2003 Seelig et al.
6,537,152 B2 3/2003 Seelig et al.
6,582,307 B2 * 6/2003 Webb .......................... 463/22
6,589,114 B2 7/2003 Rose
6,609,972 B2 8/2003 Seelig et al.
6,612,574 B1 9/2003 Cole et al.
6,612,575 B1 9/2003 Cole et al.
6,638,167 B1 10/2003 Sawyer et al.
6,659,864 B2 12/2003 McGahn et al.
6,712,694 B1 * 3/2004 Nordman ..................... 463/20
6,715,756 B2 4/2004 Inoue
6,726,204 B2 4/2004 Inoue
D496,968 S 10/2004 Baerlocher
7,011,581 B2 * 3/2006 Cole et al. .................... 463/16
7,179,169 B2 2/2007 Beaulieu et al.
7,204,754 B2 * 4/2007 Gray et al. .................... 463/16
7,210,997 B2 * 5/2007 Hughs-Baird et al. ......... 463/20
7,226,358 B2 * 6/2007 Miller et al. .................. 463/20
7,238,109 B2 * 7/2007 McGahn et al. ............... 463/16
7,241,220 B2 * 7/2007 Rothkranz et al. ............ 463/20
7,258,610 B2 * 8/2007 Seelig et al. .................. 463/20
7,300,350 B2 * 11/2007 Seelig et al. .................. 463/19
7,329,180 B2 * 2/2008 Strom ......................... 463/20
7,341,511 B2 * 3/2008 Fiden et al. ................... 463/16
7,347,775 B2 * 3/2008 Roemer ....................... 463/16
7,381,133 B2 * 6/2008 Thomas ....................... 463/20
2001/0024971 A1 9/2001 Brossard
2001/0054794 A1 12/2001 Cole et al.
2002/0094862 A1 7/2002 Inoue
2002/0142829 A1 10/2002 Inoue
2003/0040358 A1 * 2/2003 Rothkranz et al. ............ 463/20
2003/0064773 A1 * 4/2003 Baerlocher et al. ............ 463/16
2003/0069066 A1 * 4/2003 Seelig et al. .................. 463/20
2003/0083121 A1 5/2003 Cole et al.
2003/0232643 A1 12/2003 Inoue
2004/0000754 A1 1/2004 Inoue
2004/0012145 A1 1/2004 Inoue
2004/0014516 A1 1/2004 Inoue
2004/0014517 A1 1/2004 Inoue
2004/0017041 A1 1/2004 Inoue
2004/0018866 A1 1/2004 Inoue
2004/0026854 A1 2/2004 Inoue
2004/0036218 A1 2/2004 Inoue
2004/0038726 A1 2/2004 Inoue
2004/0041340 A1 3/2004 Inoue
2004/0053665 A1 * 3/2004 Baerlocher ................... 463/16
2004/0082373 A1 4/2004 Cole et al.
2004/0147305 A1 * 7/2004 Seelig et al. .................. 463/17
2004/0171417 A1 * 9/2004 Beaulieu et al. ............... 463/20
2004/0180711 A1 * 9/2004 Seelig et al. .................. 463/16
2004/0183251 A1 * 9/2004 Inoue ..................... 273/143 R
2004/0214630 A1 10/2004 Mayeroff
2004/0248647 A1 * 12/2004 Rothschild et al. ............ 463/30
2005/0020348 A1 1/2005 Thomas et al.
2005/0054424 A1 * 3/2005 Rothkranz et al. ............ 463/20
2005/0054435 A1 * 3/2005 Rodgers et al. ............... 463/25

FOREIGN PATENT DOCUMENTS

EP 1 003 138 A 5/2000

| | | |
|---|---|---|
| GB | 912685 | 12/1962 |
| GB | 2 201 821 A | 9/1988 |

OTHER PUBLICATIONS

Austin Powers in Goldmember™ Advertisement written by IGT, published in 2003.
Big Shot!™ Advertisement published by Aristocrat Technologies, Inc., published in 2002.
Bonus Roulette Brochure written by R. Franco, published prior to 2004.
Buck's Roulette Brochure written by R. Franco, published prior to 2004.
Chariot's of Fortune Brochure written by R. Franco, published prior to 2004.
Classic Pot of Gold Brochure written by Ace Coin Equipment Ltd., published prior to 2004.
Elvira® Mistress of the Dark™ Advertisement written by IGT, published in 2002.
Elvis Hits Advertisement written by IGT, published in 1999.
Holy Smoke Brochure written by Impulse Gaming Ltd., published prior to 2004.
Jack and the Beanstalk™ Brochure written by AC Coin & Slot, published prior to 2004.
King of the Grill™ Brochure written by AC Coin & Slot, published prior to 2004.
Line-Up Brochure written by AC Coin & Slot, published prior to 2004.
Little Green Men Jr.™ Advertisement written by AC Coin & Slot, published prior to 2004.
Little Green Men Jr.™ Article written by Strictly Slots, published in Feb. 2003.
Magic 8 Ball Advertisement written by IGT, published in 2002.
Miss America Brochure written by AC Coin & Slot, published prior to 2004.
Mix and Match Advertisement published by AC Coin & Slot, published prior to 2004.
Mix and Match Article written by Strictly Slots, published in Apr. 2002.
Money Grab Article written by Strictly Slots, published in Apr. 2001.
Monster Match Article written by Strictly Slots, published in Jan. 2002.
On The Money! Article written by Strictly Slots, published in Dec. 2000.
Pick a Prize Brochure written by Acres Gaming Incorporated, published prior 2001.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, published prior to 2004.
Reel Dice Advertisement written by Gerber & Glass, published in 1936.
Royal Roulette Brochure written by Impulse Gaming Ltd., published prior to 2004.
Silver City Roundup Brochure published by AC Coin & Slot, published prior to 2004.
Slot Machine Buyer's Handbook, A Consumer's Guide to Slot Machines written by David L. Saul and Daniel R. Mead, published in 1998.
Slot Machines A Pictorial History of the First 100 Years, 5$^{th}$ edition written by Marshall Fey, published in 1983-1997.
Slot Machines on Parade, 1$^{st}$ edition written by Robert N. Geddes and illustrated by Daniel R. Mead, published in 1980.
Spin-A-Lot Brochure written by Acres Gaming Incorporated, published prior to 2001.
Take Your Pick Article written by Strictly Slots, published in Mar. 2001.
Take Your Pick Brochure and Article written by IGT/Anchor Games, Strictly Slots, published in 1999.
Treasure Wheel/Treasure Tunnel Advertisement written by Sigma Game, Inc., published prior to 2000.
Wheel of Fortune Advertisement written by IGT, published in 1998.
Wheel of Fortune Article written by IGT, published in 1999.

* cited by examiner

GAMING DEVICE HAVING SELECTABLE AWARDS ON A MOVING MECHANICAL DISPLAY

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming devices such as slot machines and video poker machines provide fun and excitement for the player. Gaming, in general, provides an escape from the everyday rigors of life. Gaming devices and gaming establishments use bright lights and exciting sounds to set the gaming world apart from the rest of the world. Gaming devices, in particular, use one or more displays that enable the player to see and play the game. The displays typically portray the action of the game and ultimately indicate whether or not the player wins and often how much the player wins.

Slot machine and other gaming device displays have gone through a number of transitions since their inception. Originally, slot machines displayed purely mechanical reels. While these machines gained enormous popularity, the mechanical nature of the reels limited the number of paystops, which limited the number of different symbols and the number of different winning symbol combinations.

The advent of the computer and the video monitor expanded the possibilities for gaming devices. There are now video poker, video blackjack and other types of video gaming machines. Video displays have also been implemented in slot machines. The video slot machines use computers to randomly generate symbol combinations from an expanded number of different symbols. Video reel strips can include a virtually unlimited number of symbols, which enables a wide variety of different symbol combinations to be employed, including combinations that appear very infrequently and yield high payouts.

With slot machines, the video monitors have also been used to provide bonus or secondary games. Bonus games in wagering gaming machines have become much more prevalent and elaborate in recent years. For example, players play the base game of slot until becoming eligible for a bonus game. The base game temporarily pauses, while the player plays the bonus game. When the player completes the bonus game, the gaming device returns the player to the base game.

It should therefore be appreciated that a single video monitor is often sufficient to provide both the base game of slot and one or more bonus games that become triggered by the slot game. As illustrated in FIG. 1, there is room on the cabinet of gaming device 10 for an upper display area. That area, however, is often not utilized for gaming purposes and may simply provide a paytable, graphics and/or lettering that pertains to a theme of the gaming device.

Video monitors and in particular video-based slot machines are likely going to continue growing in popularity. As the video monitor has been used more and more, however, there has been a growing sentiment that some of the mystique of the old time mechanical gaming devices is lost when mechanical reels and mechanical displays are replaced by a video monitor.

Accordingly, a need exists to provide a wagering gaming device that may use a video monitor, which provides increased flexibility to the gaming device to add more symbols and more elaborate bonus games, while providing some aspect of the gaming device that is mechanical and provides a fun and exciting mechanical display.

SUMMARY OF THE INVENTION

The present invention relates in general to a gaming device, and more particularly to a gaming device having multiple selectable awards displayed by a moving mechanical or electromechanical display mechanism. In one embodiment, the moving display mechanism includes at least one and preferably a plurality of individual symbol display members or meters. Each individual symbol display member or meter is adapted to display at least one symbol, award or outcome. In one embodiment, the symbol(s) displayed by each individual symbol display member are determined, at least in part, based on one or more player interactions or player decisions. In one embodiment, the moving display mechanism is operable to rotate about an axis to sequentially indicate each one of the symbols, awards or outcomes displayed by one of the individual symbol display members. The symbol, award or outcome displayed on the indicated individual symbol display member is provided to the player and the game ends. The present invention therefore provides a rotatable display which includes a plurality of display devices which are each operable to display different symbols, wherein the symbols can be selected by a player and wherein one of the displayed symbols represents an outcome provided to the player.

In one embodiment, the moveable symbol display is movably connected to the gaming device cabinet. The symbol display mechanism may be any suitable shape or size. In one embodiment, the movable symbol display mechanism includes a frame or body. A plurality of individual symbol display members or meters are supported by the body. Each individual symbol display member is operable to display at least one symbol, award or outcome. In one embodiment, one individual symbol display member is suitably attached to each different side or face of the movable symbol display mechanism. In one embodiment, each individual symbol display member includes a separate display device, such as a plasma display, a display based on a plurality of light emitting diodes (LEDs), a display based on a plurality of organic light-emitting diodes (OLEDs) or any other suitable electronic device or display mechanism. In different embodiments, the displayed symbols are associated with values, multipliers, prizes, free spins, free games, game elements, non-monetary awards or any other suitable type of award or outcome. In one embodiment, the symbol(s) each individual symbol display member displays are based on one or more player interactions or player decisions.

In one embodiment, each separate display device of each individual symbol display member or meter is connected to a suitable electrical signal communicator which is in communication with a processor of the gaming device. In this embodiment, the processor sends one or more electrical signals, via the electrical signal communicator, to each individual symbol display member to transfer power to and to instruct each individual symbol display member to display one or more symbols or outcomes.

In one embodiment, the symbol display mechanism is operable, under the control of the processor, to move or rotate relative to the housing. That is, the movable symbol display mechanism is moveable or rotatable about an axis relative to the housing. In different embodiments, the symbol display mechanism rotates about a substantially horizontal axis, a substantially vertical axis or any other suitable axis. It should be appreciated that any suitable method of moving or rotating the symbol display mechanism may be employed in accordance with the present invention.

In one embodiment, the movable symbol display mechanism is mounted on an axle and rotatable via at least one drive mechanism. The axle is fixed or connected to the housing and defines the axis which the moveable symbol display mechanism rotates about. In one embodiment, the drive mechanism includes a moveable plate assembly. The moveable plate assembly is connected to one end of the body and operable to rotate the body on the axle. In one embodiment, a transversely extending member, such as a support pin is connected on an opposite end of the body. In this embodiment, the transversely extending member is connected to the housing and provides additional support as the body rotates about the axle.

In one embodiment, upon a suitable triggering event, the gaming device displays or provides a plurality of player selectable selections. Each selection is associated with an award, however, the award associated with each selection is not initially displayed to the player. The gaming device also provides the player a number of picks of the selections. For example, the number of picks is equal to the number of individual symbol display members of the symbol display mechanism.

In one embodiment, the player is enabled to pick one of the selections and the gaming device reveals the award or other outcome associated with the player picked selection. In this embodiment, after revealing the award associated with the player picked selection, the revealed award is associated with at least one of the individual symbol display members. That is, the revealed award associated with the picked selection is displayed by at least one of the individual symbol display members as an award symbol. For example, if a player picked selection is revealed to be associated with an award of fifty, then at least one of the individual symbol display members of the symbol display mechanism will be associated with and display the revealed award of fifty. It should be appreciated that, as described below, the award ultimately provided to the player is selected from the awards associated with the individual symbol display members of the symbol display mechanism. Thus, the revealed awards form a set of awards and any award provided to the player is selected from the formed set of revealed awards. In one embodiment, any award provided to the player is randomly selected from the set of revealed awards.

After associating the revealed award with at least one of the individual symbol display members, the gaming device determines if the player has any picks of the selections remaining. If the player does not have any picks of the selections remaining, the game proceeds to the award indication or award selection phase of the game as described in more detail below.

If the player has at least one pick of the selections remaining, the gaming device enables the player to pick another one of the selections. As described above, the gaming device reveals the award associated with the player picked selection, associates the revealed award with at least one of the individual symbol display members and determines if the player has any picks of the selections remaining. This process continues, as described above, until the player has no picks of the selections remaining. It should appreciated that, in one embodiment, prior to displaying each award associated with each subsequently picked selection, the gaming device partially rotates the symbol display mechanism such that another one of the individual symbol display members is viewable by the player.

When the player has no picks of the selections remaining, the gaming device proceeds to the award indication phase or stage of the game. In the award indication phase, the gaming device causes the symbol display mechanism to rotate about the axle. As the symbol display mechanism rotates, each of the revealed award which are associated with the individual symbol display members of the symbol display mechanism are temporarily displayed to the player.

The symbol display mechanism eventually stops rotating to indicate at least one of the individual symbol display members. The award associated with the indicated individual symbol display member (i.e., one of the awards associated with one of the previously player picked selections) is provided to the player and the game ends. In one embodiment, the indicated individual symbol display member is the individual symbol display member in the line of sight of the player. In another embodiment, the symbol display mechanism includes at least one symbol indicator which is operable to indicate one of the individual symbol display members.

In one embodiment, the symbol display mechanism, the individual symbol display members and the other components in the gaming device are based on a theme associated with the gaming device. It should be appreciated that the symbol display mechanism, the individual symbol display members and the other components of the gaming device may thus be any suitable size and shape and may be based on any suitable theme. It should also be appreciated that the mechanical display of the present invention may be employed in a primary game, a secondary game, in any other suitable game or in an attract, award or any other mode.

The present invention provides a game with an award generated or selected using at least one electromechanical device wherein the set of awards adapted to be generated by the electromechanical device are selected based, at least in part, on one or more player interactions.

Additional features and advantages of the present invention are described in, and will be apparent from, the following Detailed Description of the Invention and the figures.

DETAILED DESCRIPTION OF THE INVENTION

Figure 1:
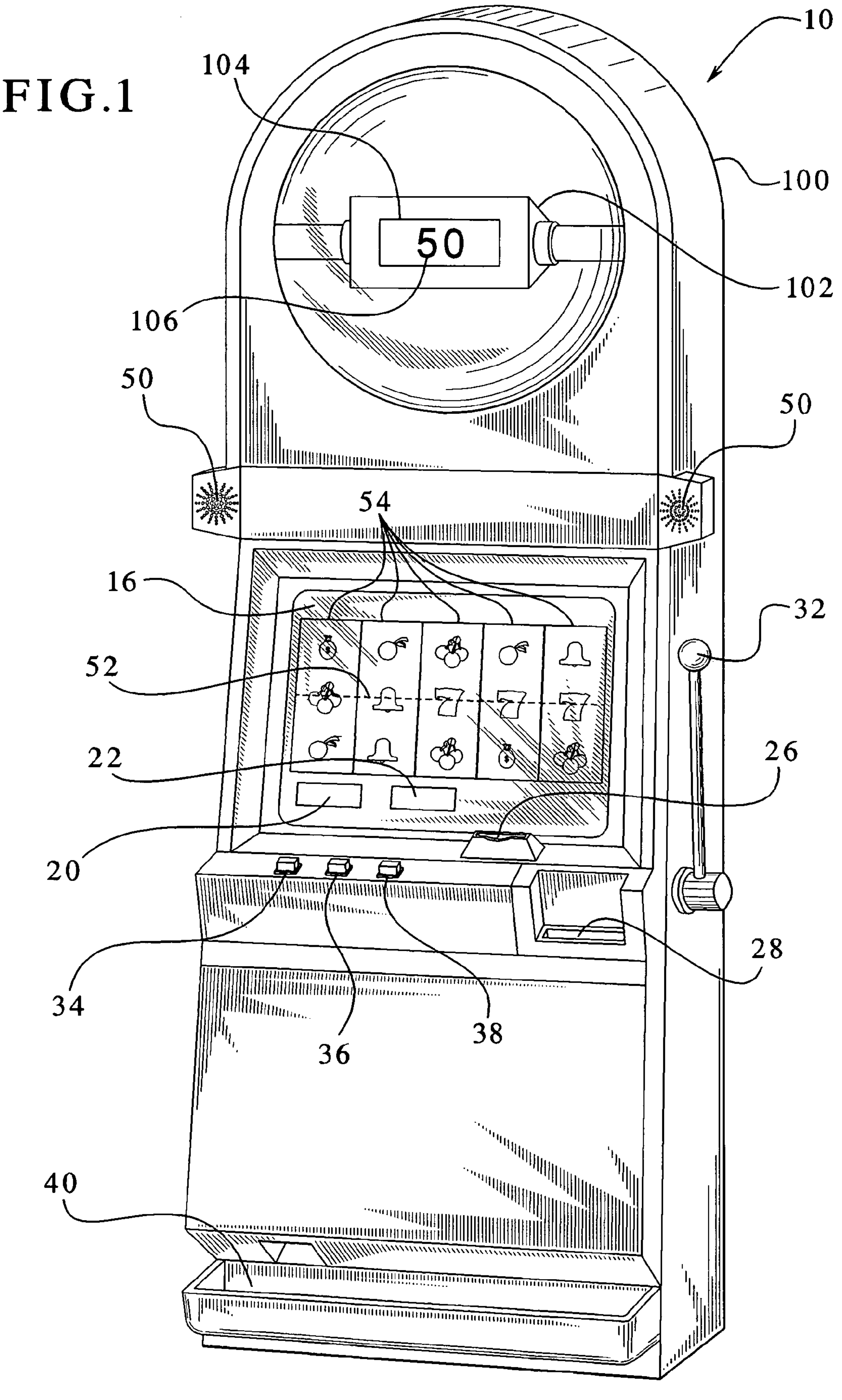
FIG. 1 is a front-side perspective view of one embodiment of the gaming device of the present invention.

Referring now to the drawings, one embodiment of the gaming device of the present invention is illustrated in FIG. 1 as gaming device 10. In the embodiment illustrated in FIG. 1, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIG. 1, the gaming device can be constructed with varying cabinet and display configurations.

Figure 2A:
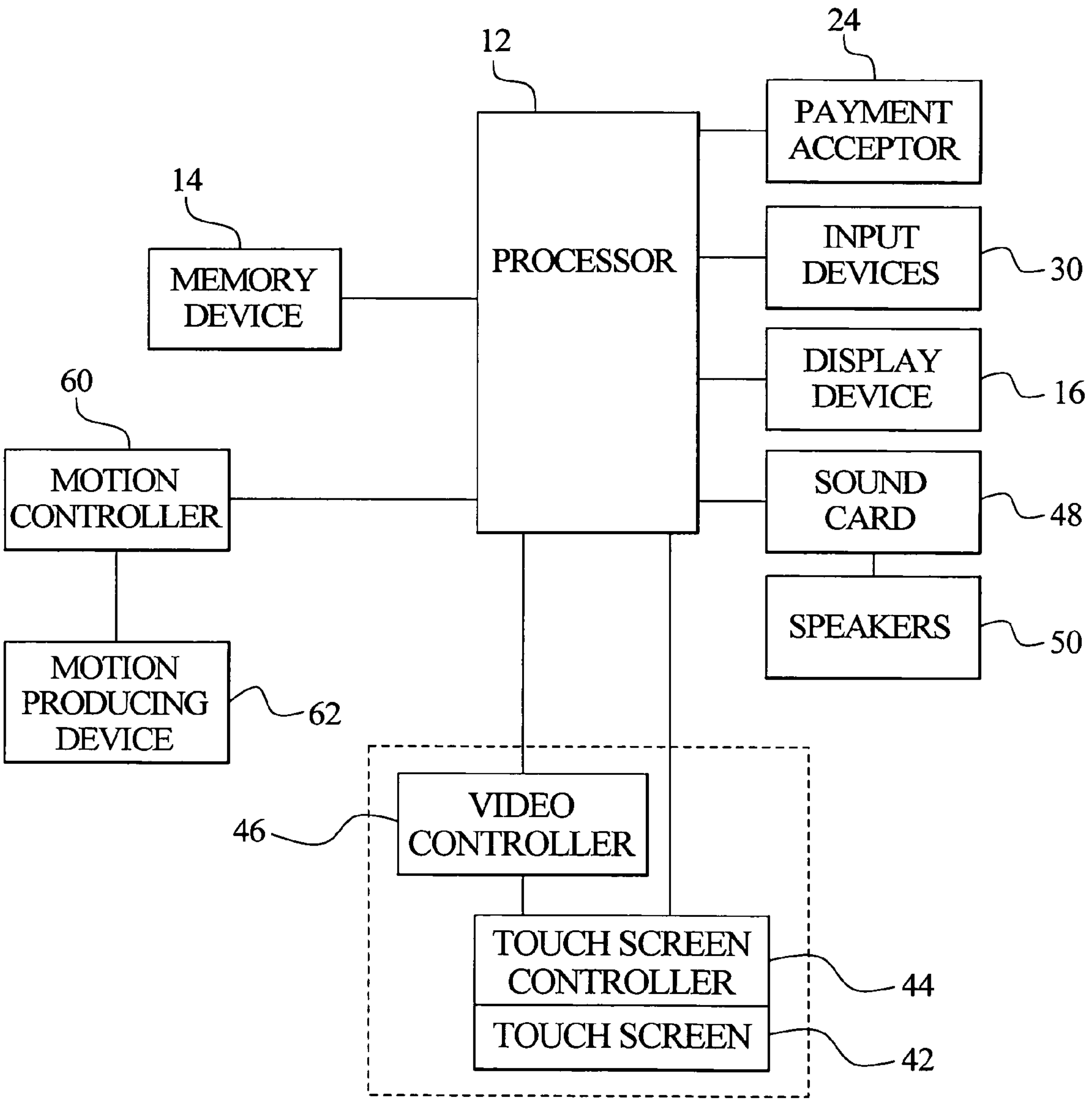
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiments shown in FIG. 1 include a central display device 16 which displays a primary game. This display device may also display any suitable secondary game associated with the primary game as well as information relating to the primary or secondary game.

As seen in FIG. 1, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED), a display based on organic light-emitting diodes (OLED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form as described in more detail below. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

In one embodiment, the gaming device includes one or more motion controllers 60 in communication with the processor. The processor is operable to control the output of the motion controllers which are operable to control one or more motion producing devices 62. The motion producing devices 62 can be any combination of motors, servo motors, AC/DC motors or any other type of device that outputs a rotating member. The motion controllers 60 typically include printed circuit boards or stand alone enclosures that receive high level commands from the processor. The motion controller 60 converts the high level commands, for example, into a number of step pulses, which in turn are converted into motor currents. The stepper motor or other type of motion producing device 62 receives the currents, wherein the currents cause, for example, a rotor to turn within a stator a precise and desired amount.

The controllers 60 and motion devices 62 produce motion control scheme that includes complex movements of multiple parts. That scheme is programmed into the memory device and carried out by the processor at the appropriate time in the sequence of the game, be it a base, bonus, bonus triggering or progressive sequence of gaming device. Moreover, multiple programs can be implemented in the memory device, wherein the processor runs the appropriate program at the appropriate time, and wherein the moving display mechanism described below can perform or move differently, e.g., faster, slower or in different rotational directions at different times or points in the game. The motion control programs, in one embodiment, interface with one or more random generation devices, typically software based items, to produce randomly displayed outcomes on the displays of the present invention.

As illustrated in FIG. 2A, in one embodiment, the gaming device includes at least one payment acceptor 24 in communication with the processor. As seen in FIG. 1, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1 and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIG. 1, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIG. 1, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIG. 1. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
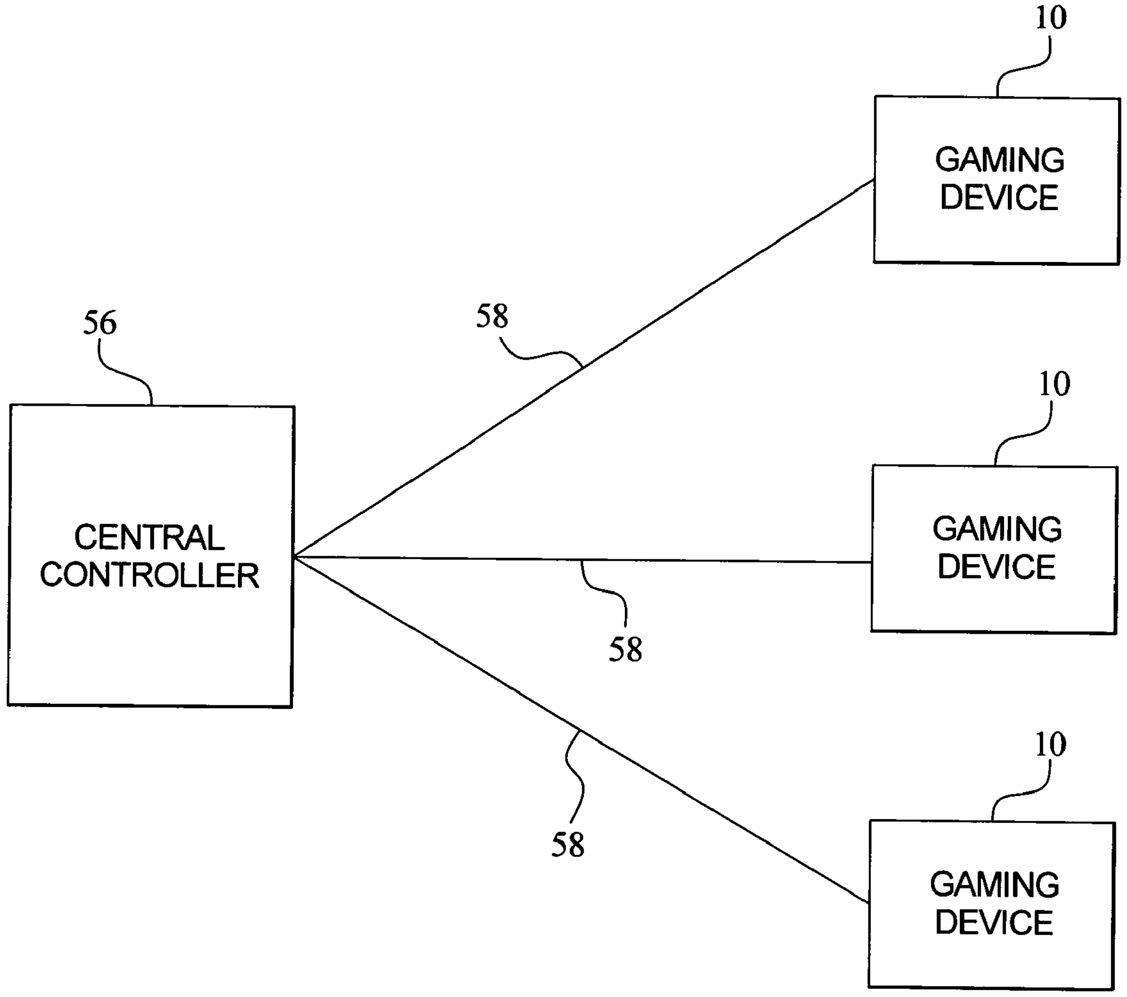
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Electromechanical Display Device

In one embodiment of the present invention, the gaming device includes a secondary display, such as a mechanical display device, including a housing 100. The secondary display is suitably connected to or mounted to the top of the cabinet of a gaming device. As illustrated in FIG. 1, the secondary display is suitably connected to or mounted to the top of the cabinet of the gaming device. In another embodiment, the housing is separate from the gaming device cabinet such as in a display above the cabinet of the gaming device or in a bank of gaming devices associated with or activated upon a triggering event in a gaming device. It should be appreciated that, in one embodiment, at least a portion of the housing of the secondary display includes a transparent or substantially transparent or see-through protective material to enable a player to view the components inside the housing. The transparent material may include glass, plastic or any suitable transparent or substantially transparent or see-through protective material.

In one embodiment, the housing includes a rotatable symbol display mechanism 102. The rotatable symbol display mechanism may be any suitable shape or size. The rotatable symbol display mechanism 102 includes a plurality of individual symbol display members 104$a$, 104$b$ and 104$c$. Each individual symbol display member is operable to display at least one symbol, award or outcome 106. It should be appreciated that the mechanical display device 100 may be employed as part of a primary or base game, a secondary or bonus game, or as part of any suitable game, attract mode or other suitable use. It should also be appreciated that any suitable moving symbol display mechanism, such as one or more mechanical rotatable wheels, reels or dice, may be employed in accordance with the present invention.

Figure 3A:
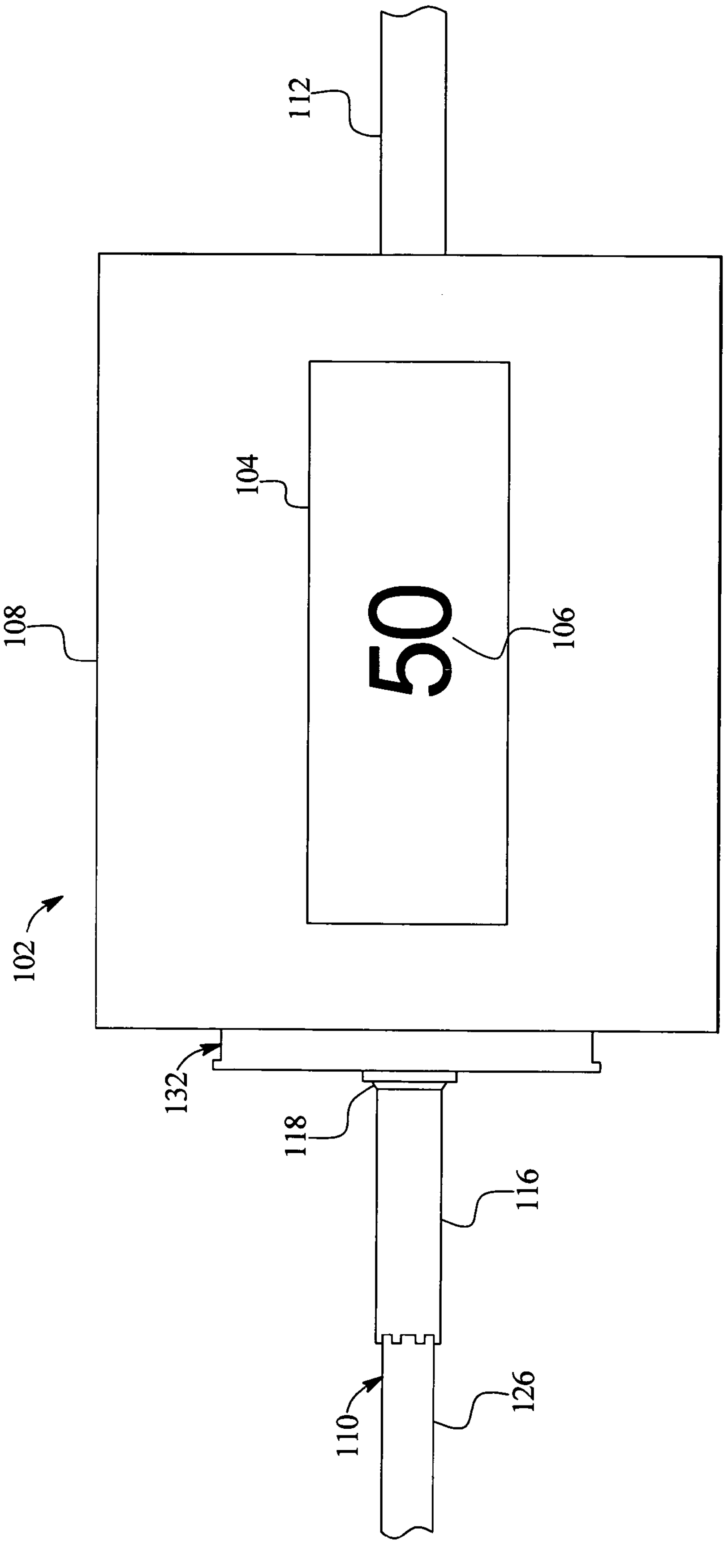
FIG. 3A is a front view of the symbol display mechanism shown in the embodiment of FIG. 1.
Figure 3B:
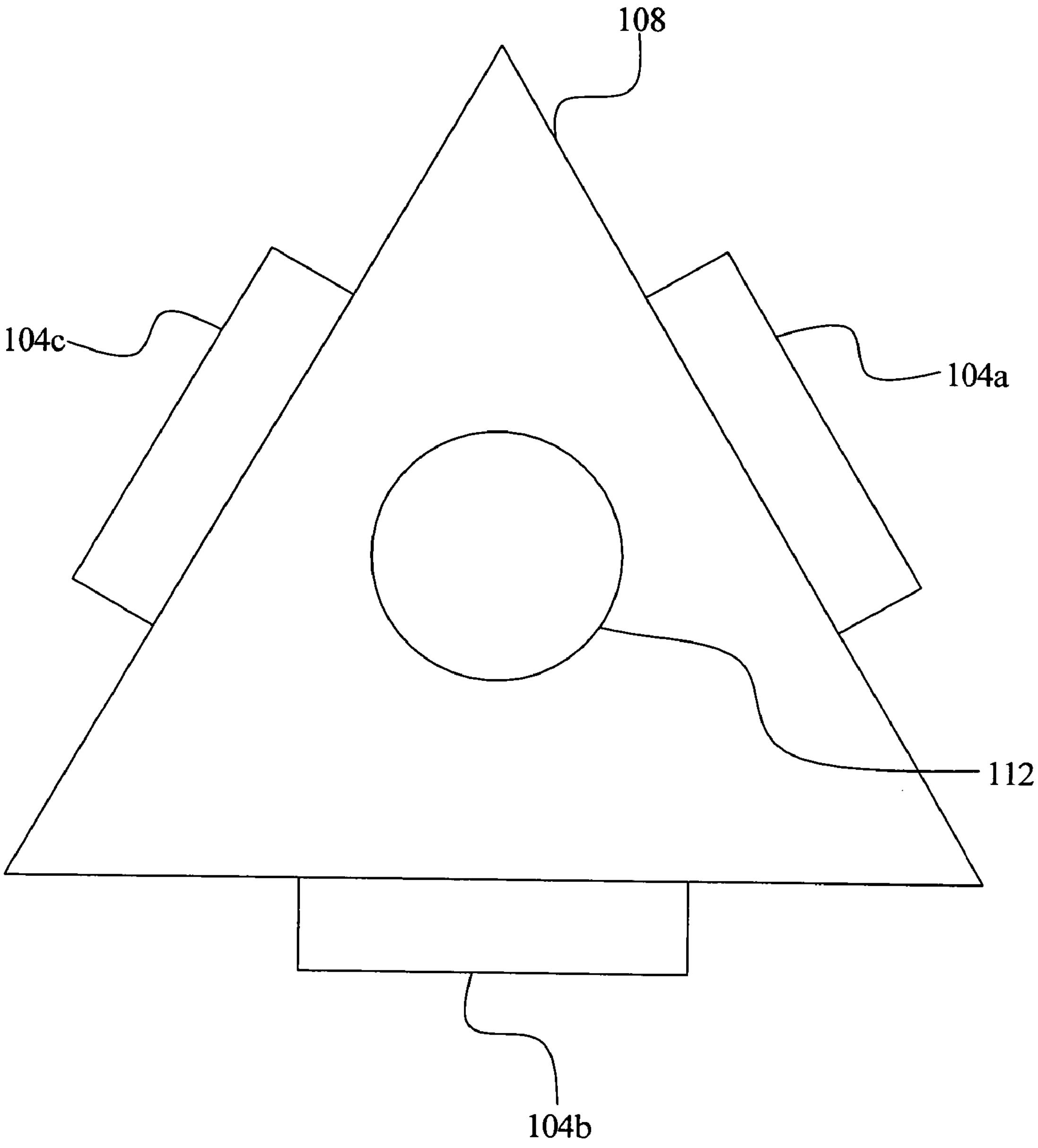
FIG. 3B is a side view of the symbol display mechanism shown in the embodiment of FIG. 1.

Referring now to FIGS. 3A and 3B, in one embodiment, the rotatable symbol display mechanism includes a frame or body 108. The body is manufactured using a durable material such as stainless steel or other suitable metal. It should be appreciated that the body may be manufactured using any suitable material. A plurality of individual symbol display members or meters 104*a*, 104*b* (not shown) and 104*c* (not shown) are supported by the body 108. The individual symbol display members are suitably spaced apart on the body. In one embodiment, one individual symbol display member is suitably attached to each different side or face of the body. Each individual symbol display member includes a separate display device, such as a plasma display, a liquid crystal display (LCD), a display based on light emitting diodes (LED), a display based on a plurality of organic light-emitting diodes (OLEDs) or any other suitable electronic device or display mechanism.

Each separate display device of each individual symbol display member or meter is connected to a suitable electrical signal communicator which is in communication with the processor of the gaming device. In one embodiment, the processor sends one or more electrical signals, via the electrical signal communicator to each individual symbol display member to transfer power to and cause each individual symbol display member to display one or more symbols or outcomes. In another embodiment, one signal is sent to the individual symbol display members to transfer power and another signal is sent to the individual symbol display members to cause each individual symbol display member to display one or more symbols or outcomes.

The rotatable symbol display mechanism is operable, under the control of the processor, to rotate relative to the housing. The rotatable symbol display mechanism rotates on an axle 112 which defines an axis. In different embodiments, the defined axis is substantially horizontal, substantially vertical or any other suitable axis.

In one embodiment, as illustrated in FIG. 3A, the rotatable symbol display mechanism includes at least one drive mechanism 110. The drive mechanism includes a moveable plate assembly connected to one end of the body. The drive mechanism is controlled by or in communication with the processor and operable to rotate the body on the axle. In one embodiment, one end of the axle is connected on an opposite end of the body and the other end of the axle is connected to the housing to provide additional support. In another embodiment, opposite ends of the body each include a separate drive mechanism operable to rotate the body about an axis. It should be appreciated that in this embodiment, the processor controls each drive mechanism to provide that the drive mechanism function in sync to cause the body to rotate in a smooth and fluid fashion.

As illustrated in FIGS. 3A, 3C, 3D and 3E, in one embodiment, the drive mechanism includes a movable plate assembly 132. In this embodiment, the moveable plate assembly includes a moveable base plate 114*a*, a circuit board plate 114*b* mounted to the base plate 114*a* and a slip disk 114*c* mounted to the circuit board plate 114*b*. In one embodiment, as described in more detail below, the body includes a signal receiver 134 (shown in phantom in FIG. 3E) for receiving any signal transferred from the slip disk of the plate assembly. It should be a appreciated that any suitable method of rotating the rotatable symbol display mechanism about an axis may be employed in accordance with the present invention.

In one embodiment, the moveable base plate 114*a* is manufactured using a durable material such as stainless steel or other suitable metal. It should be appreciated that the base plate may be manufactured using any suitable material. The base plate 114*a* also includes a plate support 116 extending generally transversely from the base plate. In one embodiment, the plate support 116 is connected to a plate flange 118 which is connected to the moveable plate 114*a*. The plate flange 118 adds further stability to the attachment between the plate support and the plate. In another embodiment, the plate support 116 is integrally formed with the plate.

In one embodiment, the plate support 116 is inserted into and is rotatably connected to the housing 100 and rotates or moves relative to the housing. An actuator, such as an electric motor, stepper motor or any other suitable motor or the like (not shown) is coupled with an end of the plate support 116 (the end opposite to the end connected to the body of the rotatable symbol display mechanism). The actuator is operable to move or rotate the plate support and thereby move or rotate the base plate 114*a* and the body connected to the base plate in a clockwise direction, a counterclockwise direction or in any suitable combination of directions.

Figure 3C:
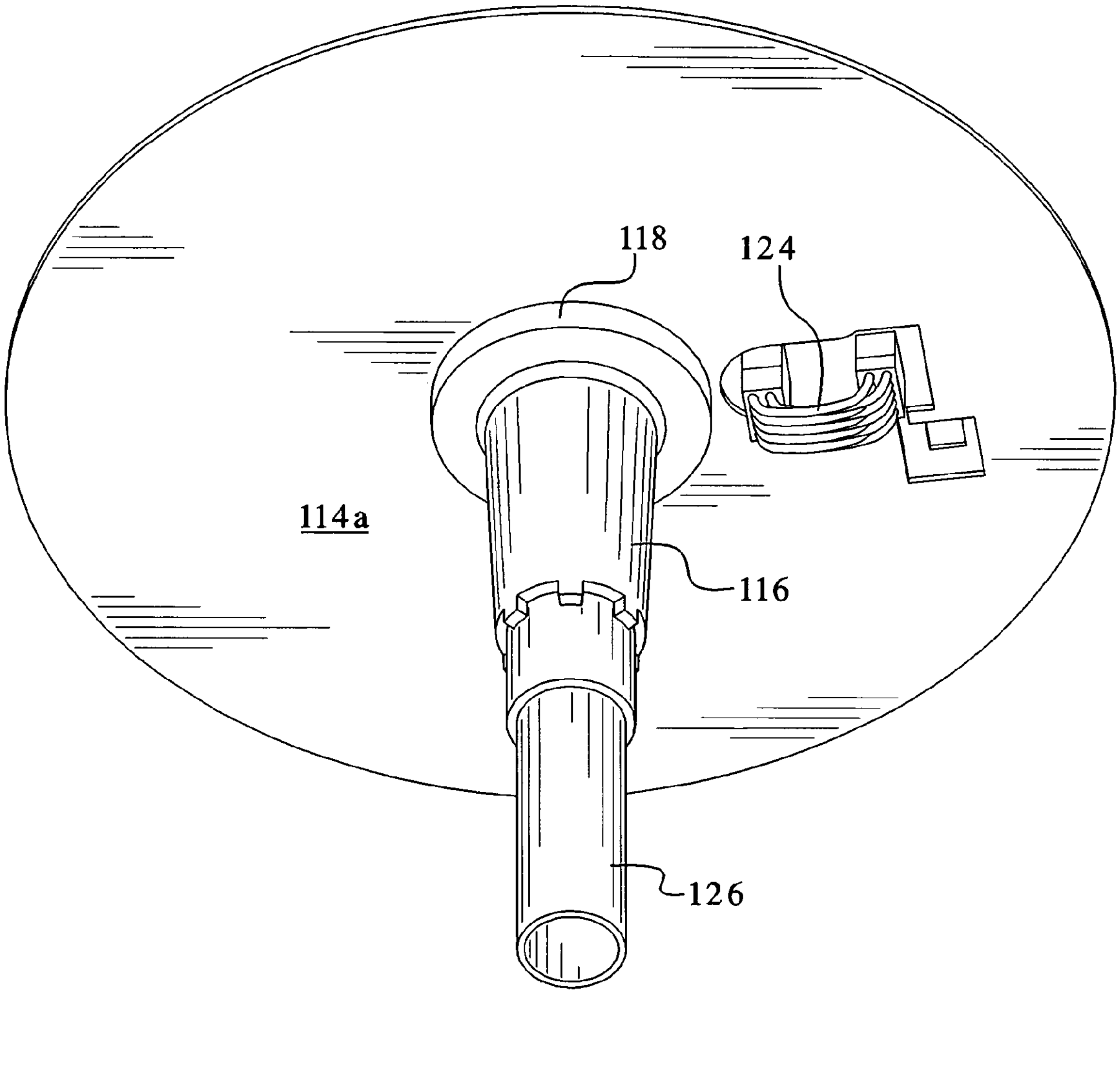
FIG. 3C is an enlarged bottom perspective view of one embodiment of the drive mechanism shown in FIG. 3A.
Figure 3D:
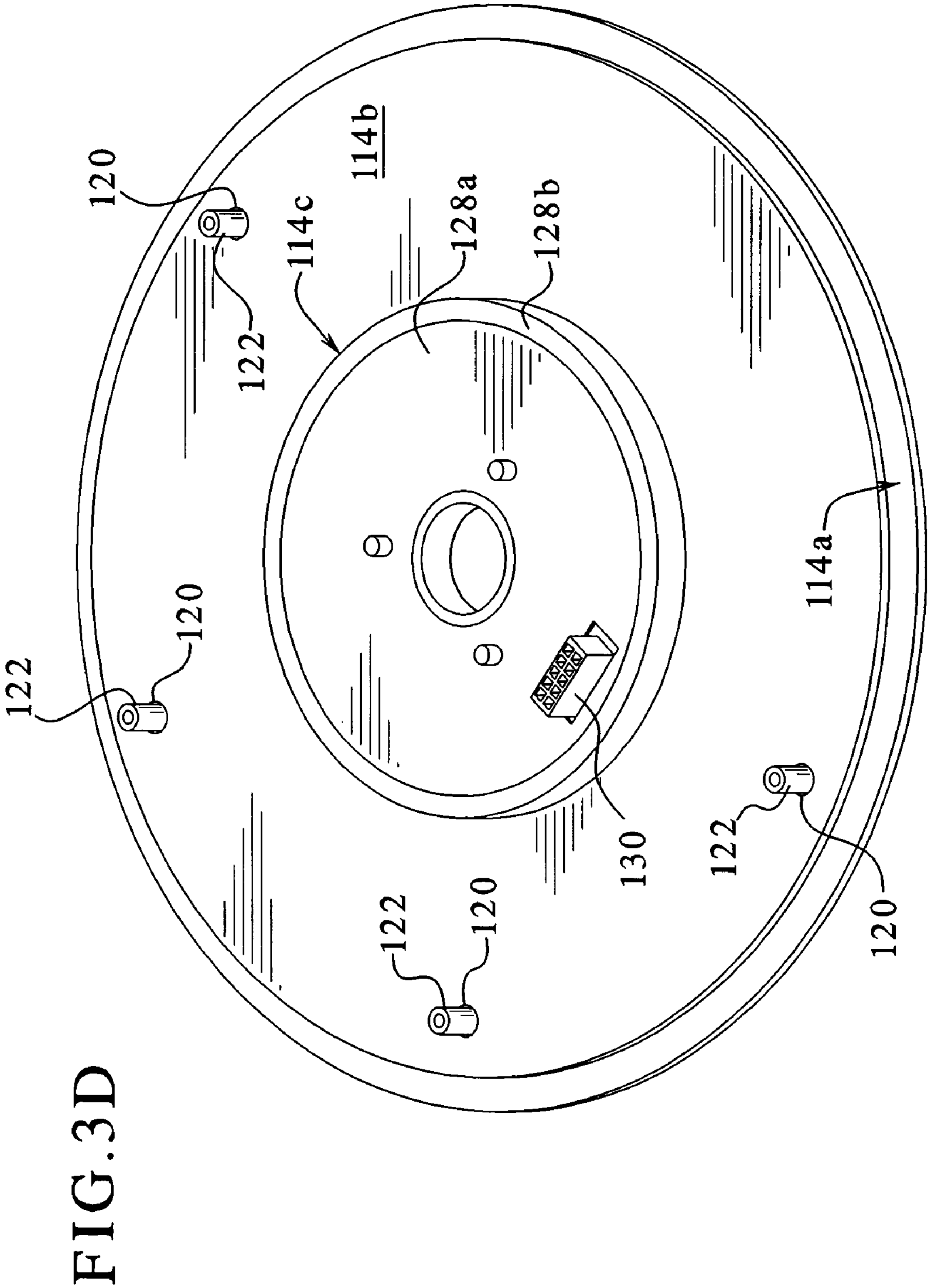
FIG. 3D is an enlarged top perspective view of the drive mechanism of FIG. 3C.
Figure 3E:
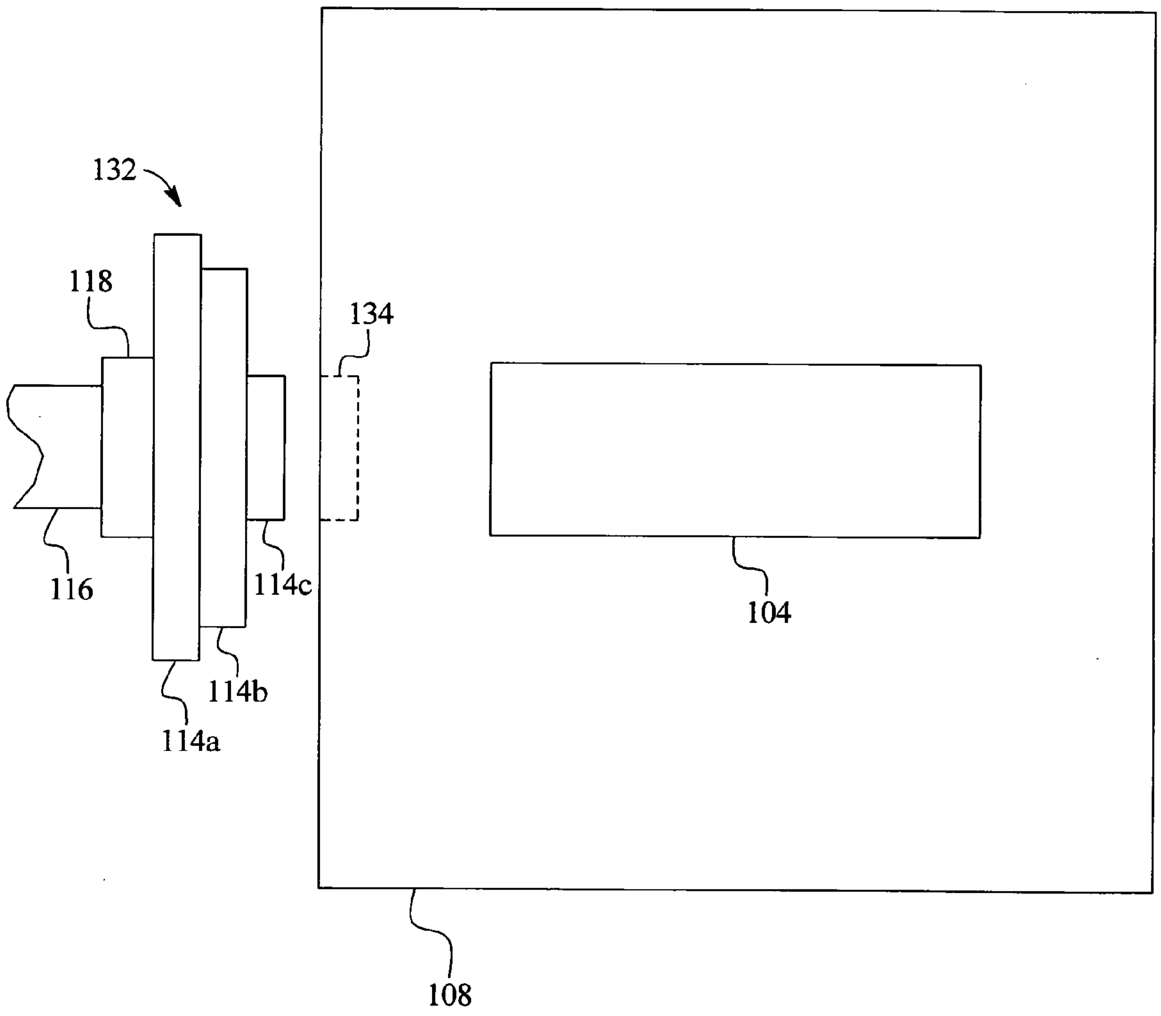
FIG. 3E is an enlarged side view of the one embodiment of the drive mechanism of the present invention.

Referring now to FIGS. 3C, 3D and 3E, in one embodiment, a circuit board plate 114*b* is mounted on the top side or surface of the base plate 114*a*. The circuit board plate defines several openings 120 that receive alignment members 122, which are attached to the base plate 114*a*. The alignment members 122 maintain the position of the circuit board plate 114*b* on the base plate 114*a* and prevent the circuit board plate 114*b* from moving out of position. The circuit board plate 114*b* also includes a wiring mechanism or harness 124 which is connected to the circuit board plate at one end and to a slip disk at a second end (not shown). The wiring harness 124 transfers or communicates electrical signals from the processor to the slip disk 114*c* and in turn, to each of the individual symbol display members as described below. It should be appreciated that any suitable slip disk or slip ring may be employed in accordance with the present invention, such as the compact commercial slip ring capsule (part no. AC-6305) manufactured by Moog Components Group of Blacksburg, Va.

In one embodiment, the plate assembly includes a slip disk 114*c*, which is positioned in the center of the circuit board plate 114*b* and is mounted to the top end of a first gear support 126. Specifically, the slip disk 114*c* includes a fixed or stationary slip disk member 128*a* and a moveable slip disk member 128*b*. The fixed slip disk member 128*a* is connected or attached to the top end of the first gear support 126. Therefore, the fixed slip disk member 128*a* remains stationary during the movement of the base plate 114*a*. The moveable slip disk member 128*b* is positioned adjacent to the fixed slip disk member 128*a* and rotates or moves with respect to the fixed slip disk member 128*a*. In one embodiment, the moveable slip disk member 128*b* is connected or mounted to the base plate 114*a* using suitable connectors. The moveable slip disk member 128*b* therefore moves in sync with or in accordance with the movement of the base plate 114*a*.

In one embodiment, suitable electrical wiring is connected to the processor at one end. The opposite end of the wiring is inserted into and through the center of the first gear support 126 and is connected to a main wire connector 130 of the fixed slip disk member 128*a*. In one embodiment, the fixed slip disk member 128_a_ includes a plurality of electrical connectors or electrical contacts (not shown) on the bottom side of the fixed slip disk member which electrically contact similar electrical contacts on the top surface or side (not shown) of the moveable slip disk member 128_b_. The slip disk 114_c_ thereby enables electrical signals from the processor and power to be transferred or communicated to the slip disk and specifically to the fixed slip disk member 128_a_ (and subsequently to the signal receiver of the body) when the base plate 114_a_, circuit board plate 114_b_ and moveable slip disk member 128_b_ are moving or rotating. It should be appreciated that as illustrated in FIG. 3E, the electric signals are transferred over the slight gap or space which exists between the body (specifically the signal receiver) and the fixed spin disk member.

In another embodiment, the body rotates via the rotation of an axle. In this embodiment, one end of the axle is connected to the body and the opposite end of the axle is inserted into and is rotatably connected to the housing 100 and rotates or moves relative to the housing. An actuator, such as an electric motor, stepper motor or any other suitable motor or the like (not shown) is coupled with an end of the axle (the end opposite to the end connected to the body of the rotatable symbol display mechanism). The actuator is operable to move or rotate the axle in a clockwise direction, a counterclockwise direction or in any suitable combination of directions. In this embodiment, the gaming device utilizes one or more slip disks to transfer electric signals between the rotating body and the processor of the gaming device. It should be appreciated that any suitable method of rotating the symbol display mechanism may be employed in accordance with the present invention.

Figure 4:
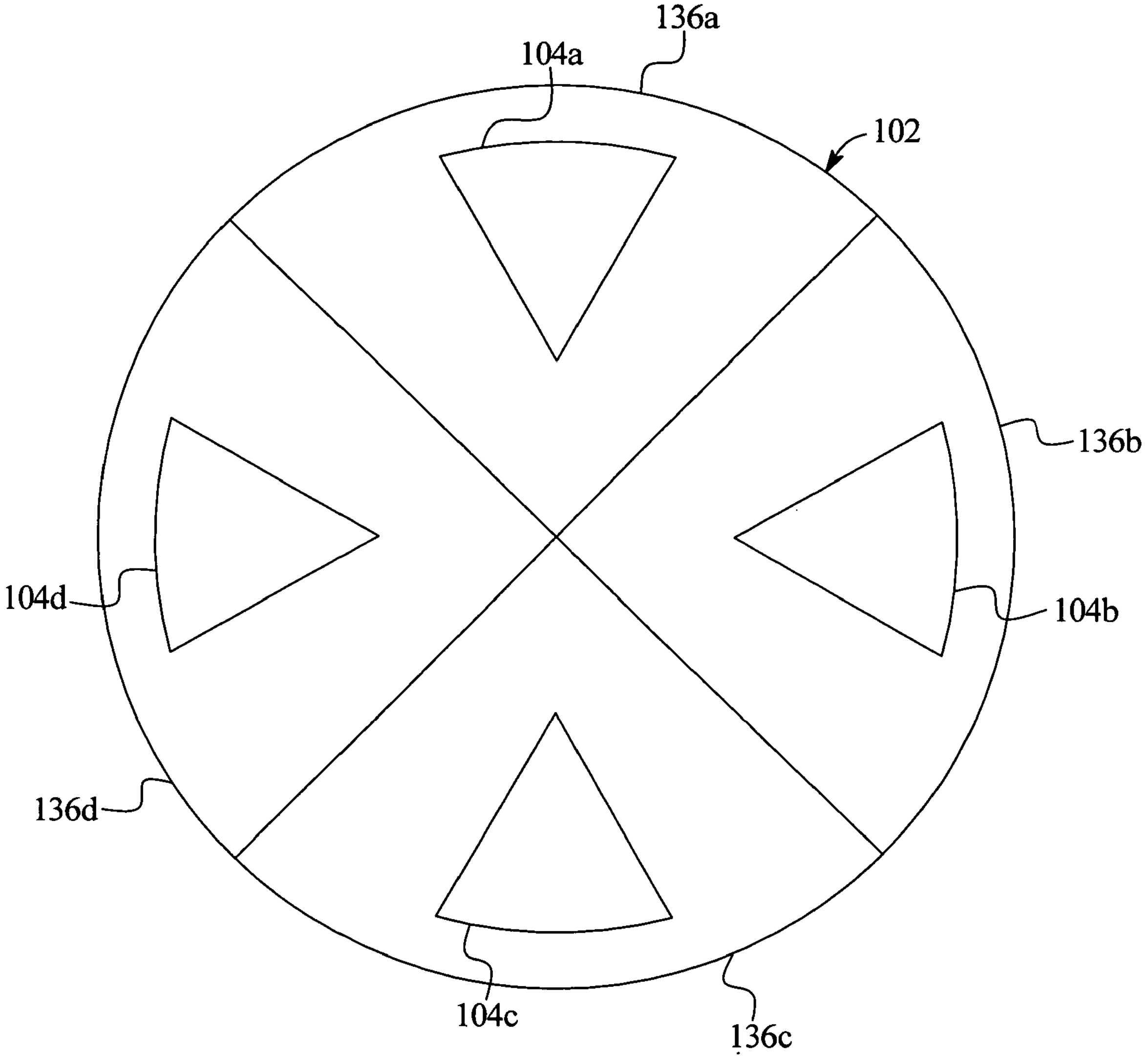
FIG. 4 is a front view of an alternative embodiment of the symbol display mechanism of the present invention.

As illustrated in FIG. 4, in another embodiment, the rotatable symbol display mechanism 102 includes a mechanical rotatable wheel attached to the housing. In one embodiment, the mechanical rotatable wheel includes a plurality of sections 136_a_, 136_b_, 136_c_ and 136_d_. The mechanical rotatable wheel supports a plurality of individual symbol display members or meters as described above wherein sections 136_a_, 136_b_, 136_c_ and 136_d_ are associated with individual symbol display members 104_a_, 104_b_, 104_c_ and 104_d_, respectively. As described above, the mechanical rotatable wheel is controlled by the processor and operable to move or rotate in a clockwise or counter-clockwise direction. It should be appreciated that any suitable electromechanical device which supports at least one and preferably a plurality of individual symbol display members, such as one or more reels or dice, may be employed with the present invention.

Selection Game

Figure 5A:
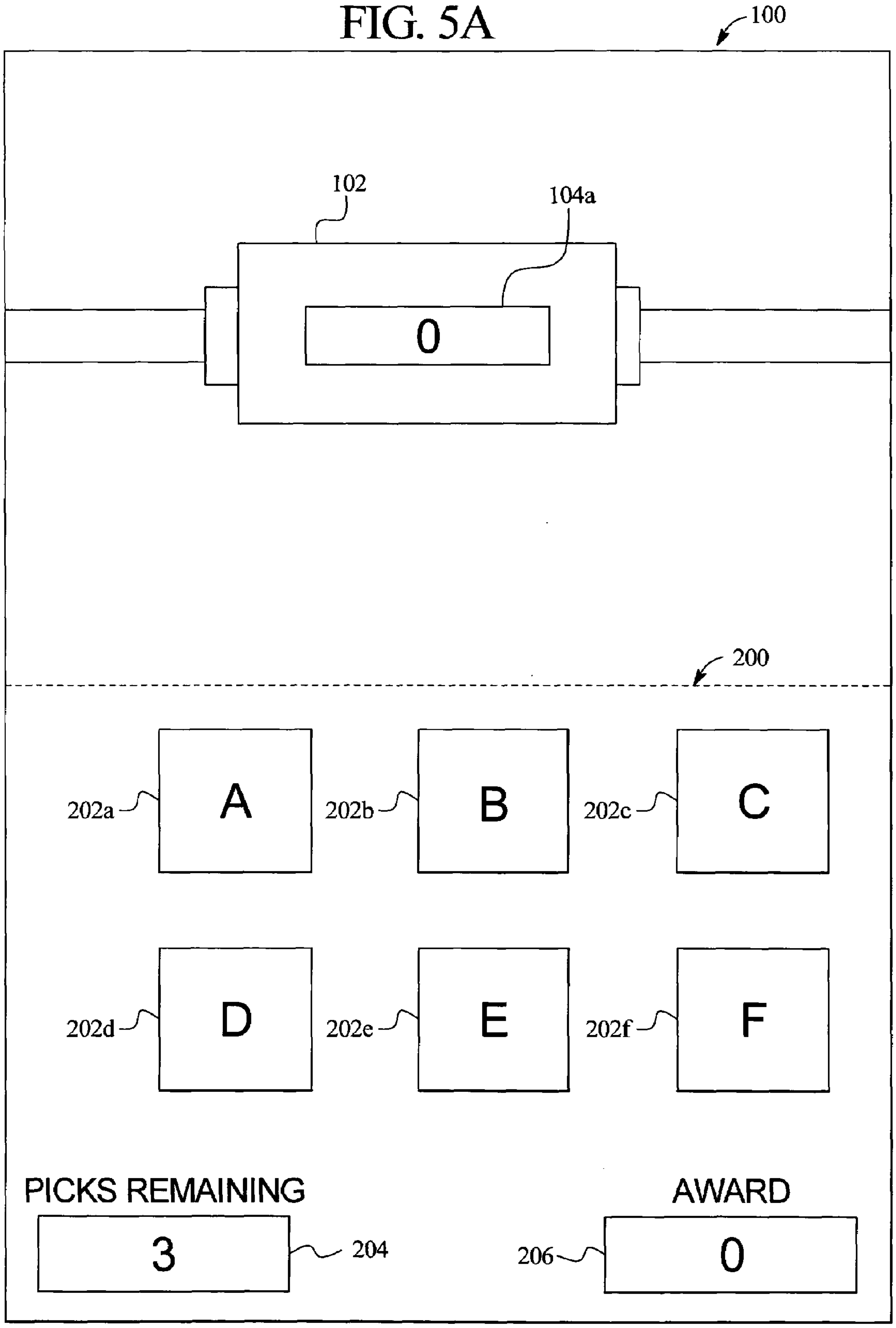
FIGS. 5A, 5B, 5C, 5D, 5E, 5F and 5G are front elevational views of one embodiment of the gaming device of the present invention, wherein the player picks selections to form a set of awards and the symbol display mechanism indicates one of the awards from the player picked set of awards.

Referring now to FIG. 5A, in one embodiment of the present invention, upon or after a suitable triggering event, the gaming device provides a screen or display 200 which enables a player to make selections to obtain one or more awards which may be provided to the player. It should be appreciated that while the screen 200 and the housing of the secondary display 100 are displayed adjacent to each other in FIGS. 5A to 5G, the screen and housing may be located at different areas of the gaming device as illustrated in FIG. 1.

In one embodiment of the present invention, the gaming device provides a plurality of selectable selections 202_a_, 202_b_, 202_c_, 202_d_, 202_e_ and 202_f_. In one embodiment, each selection is associated with an award, however, the award associated with each selection is not initially displayed to the player. The awards may be values, prizes, modifiers or multipliers, free spins, free games, game elements or any other suitable type of award or outcome.

In one embodiment, each of the awards are different. In another embodiment, a plurality of the awards are different. In another embodiment, each of the awards are the same. In one embodiment, each of the awards associated with the selections is selected from one or more pools of awards. In another embodiment, each of the awards is selected from one or more ranges of awards. In another embodiment, each of the awards is associated with a probability and each of the awards is selected based on the associated probabilities. In different embodiments, the awards are predetermined, randomly determined, determined based on the player's wager in a primary game, determined from the occurrence of one or more symbols in a primary game or determined based on any other suitable method.

The gaming device also provides the player a number of picks of the selections. The provided number of picks is displayed to the player in a pick remaining display device 204. In one embodiment, the number of picks is equal to the number of individual symbol display members of the rotatable symbol display mechanism. In alternative embodiments, the number of picks may be less than or greater than the number of individual symbol display members. In different embodiments, the number of picks of the selections is predetermined, randomly determined, determined based on the player's wager in a primary game, determined from the occurrence of one or more symbols in a primary game or determined based on any other suitable method.

Figure 5B:
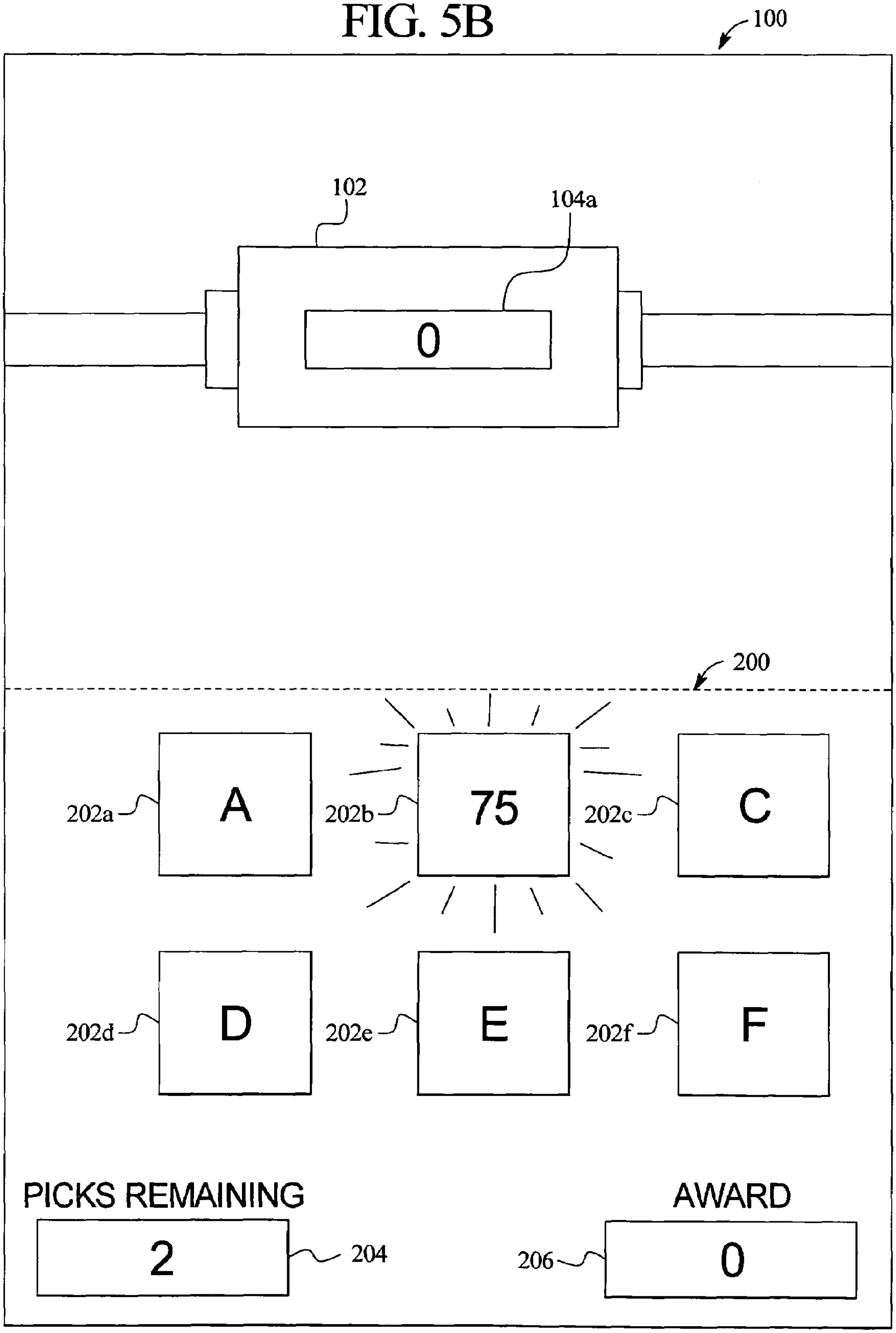

In one embodiment, the player is enabled to pick one of the selections and the gaming device reveals the award associated with the player picked selection. As illustrated in FIG. 5B, the player picked selection 202_b_ and the gaming device revealed an award value of seventy-five associated with picked selection 202_b_. It should be appreciated that after the player picks one of the selections, the pick remaining display is reduced by one to account for the player picked selection. In different embodiments, at least one picked selection will reduce the amount of picks remaining by more than one pick or zero picks.

Figure 5C:
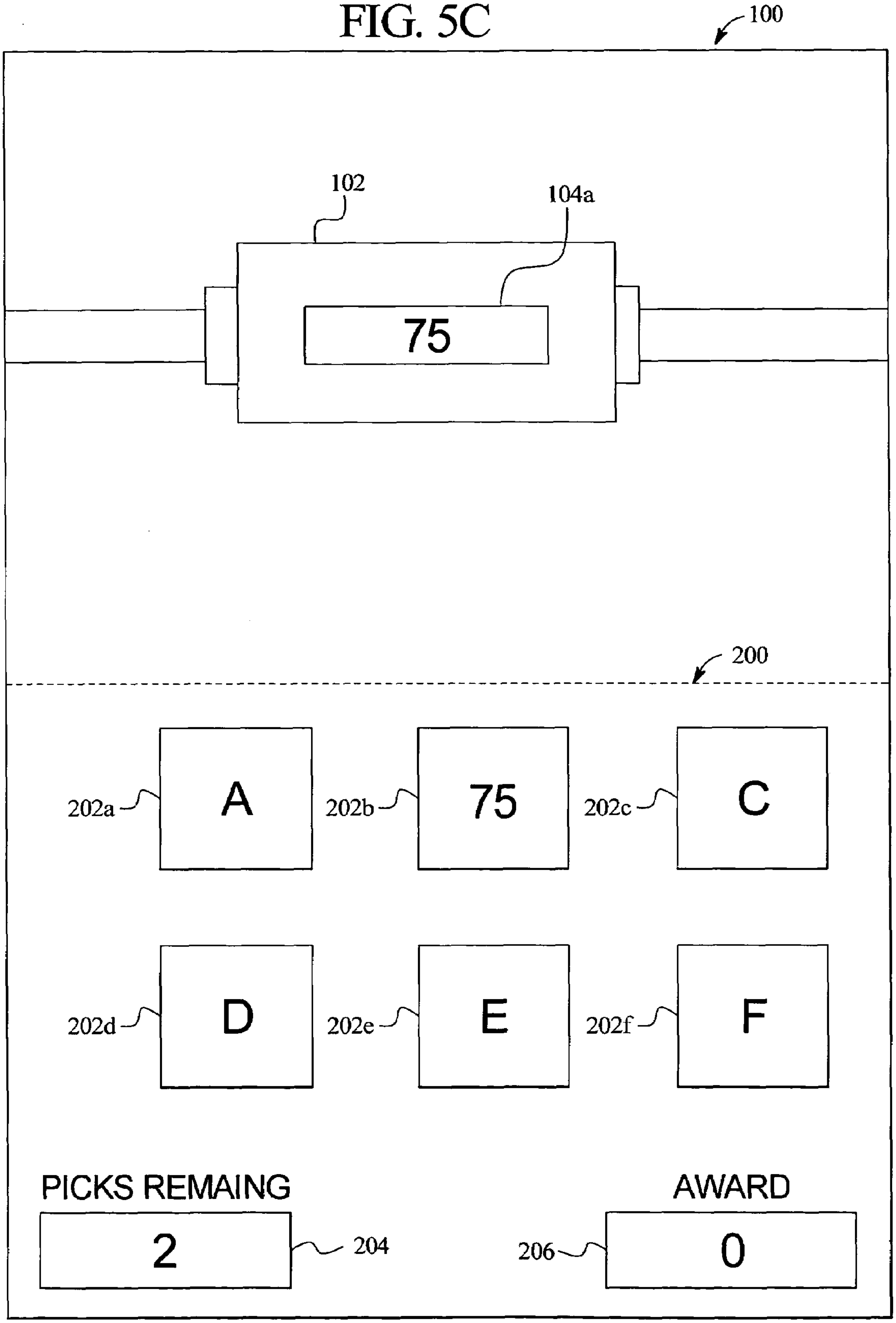

Additionally, upon the player picking one of the selections, the award associated with the picked selection is associated with one of the individual symbol display members. That is, the revealed award associated with the picked selection is displayed as one of the symbols, awards or outcomes adapted to be selected or generated by the rotatable symbol display mechanism. As the player picked selection 202_b_ and the gaming device revealed an award value of seventy-five associated with picked selection 202_b_, the revealed award value of seventy-five is associated with and displayed by one of individual symbol display members 104_a_ as illustrated in FIG. 5C. Appropriate messages such as "PLEASE PICK A SELECTION" and "YOUR PICKED SELECTION HAS A VALUE OF 75" may be provided to the player visually, or through suitable audio or audiovisual displays.

In one embodiment, the revealed award associated with the player picked selection is associated with and displayed by at least one individual symbol display member. In another embodiment, the revealed award associated with the player picked selection is associated with and displayed by a plurality of the individual symbol display members. In another embodiment, the revealed award associated with the player picked selection is associated with and displayed by each of the individual symbol display members. In other embodiments, the individual symbol display member the revealed award is associated with and displayed by is predetermined, randomly determined, determined based on the player's wager in a primary game, determined from the occurrence of one or more symbols in a primary game or determined based on any other suitable method.

After displaying the revealed award as one of the individual symbol display members, the gaming device determines if the player has any picks of the selections remaining. If the player has at least one pick of the selections remaining, in one embodiment, the gaming device partially rotates the rotatable symbol display mechanism such that another individual symbol display member is viewable by the player. In another embodiment, the gaming device rotates the rotatable symbol display mechanism such that a randomly selected individual symbol display member is viewable by the player. In this example, the gaming device partially rotated the symbol display mechanism such that individual symbol display member 104*b* is viewable by the player.

After rotating the rotatable symbol display mechanism, the gaming device enables the player to pick another one of the selections and the award associated with the picked selection is revealed to the player. In this example, as illustrated in FIG. 5D, the player picked selection 202*d* and the gaming device revealed an award value of two-hundred-twenty-five associated with picked selection 202*d*.

In one embodiment, the gaming device provides the same plurality of selections for the player to select from for each pick. In another embodiment, the gaming device provides a different plurality of selections for the player to select from for each pick. In another embodiment, the gaming device modifies or alters the plurality of selections the player is enabled to pick from for each pick. In another embodiment, the gaming device reassociates the player picked selection with a different award and reshuffles the plurality of selections.

Figure 5D:
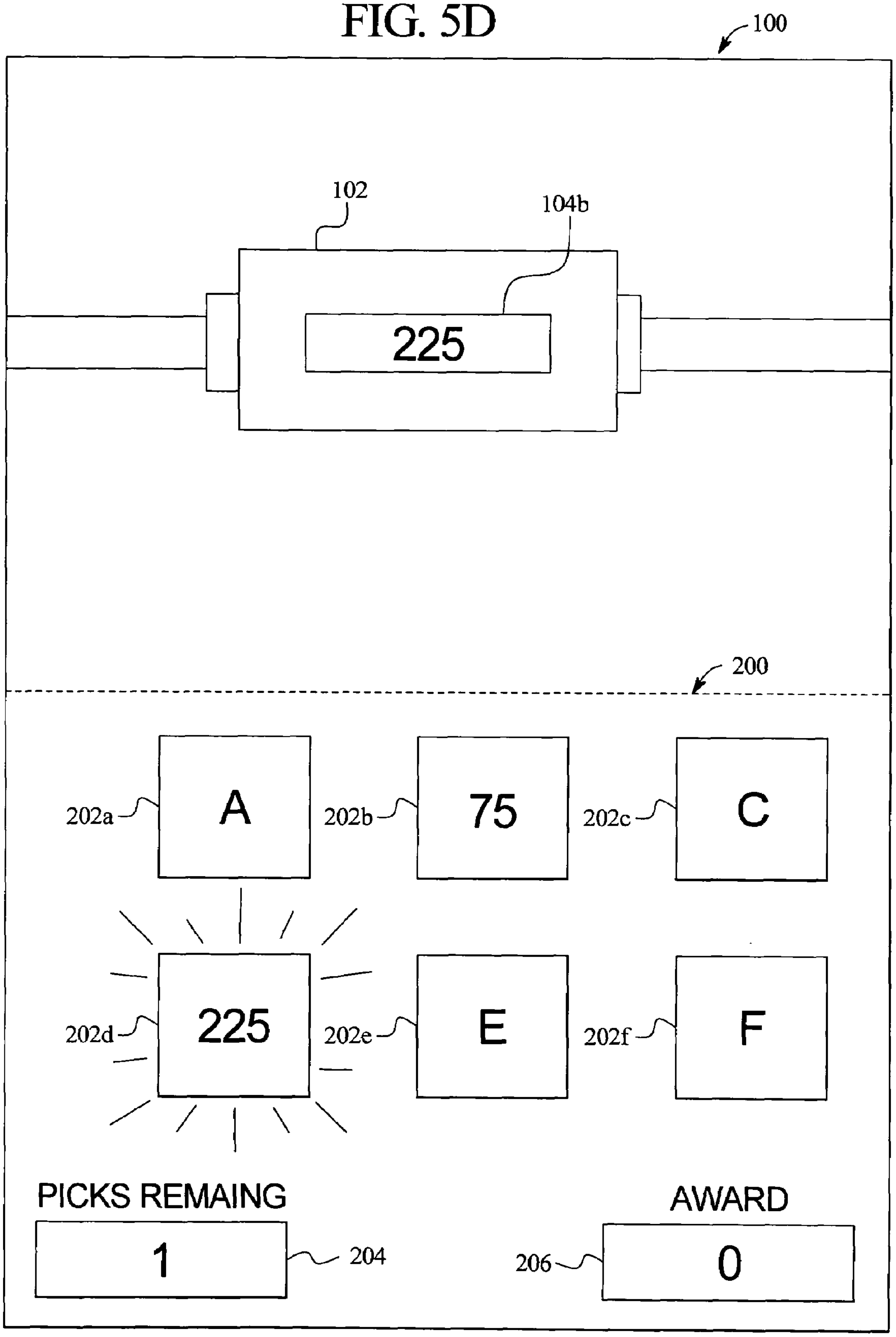

As illustrated in FIG. 5D, in addition to revealing any award associated with the player picked selection, the gaming device associates and displays the award associated with the picked selection with another one of the individual symbol display members. In this example, the revealed award value of two-hundred-twenty-five is associated with and displayed by one of individual symbol display members 104*b*. Appropriate messages such as "PLEASE PICK ANOTHER SELECTION" and "YOUR PICKED SELECTION HAS A VALUE OF 225" may be provided to the player visually, or through suitable audio or audiovisual displays.

Figure 5E:
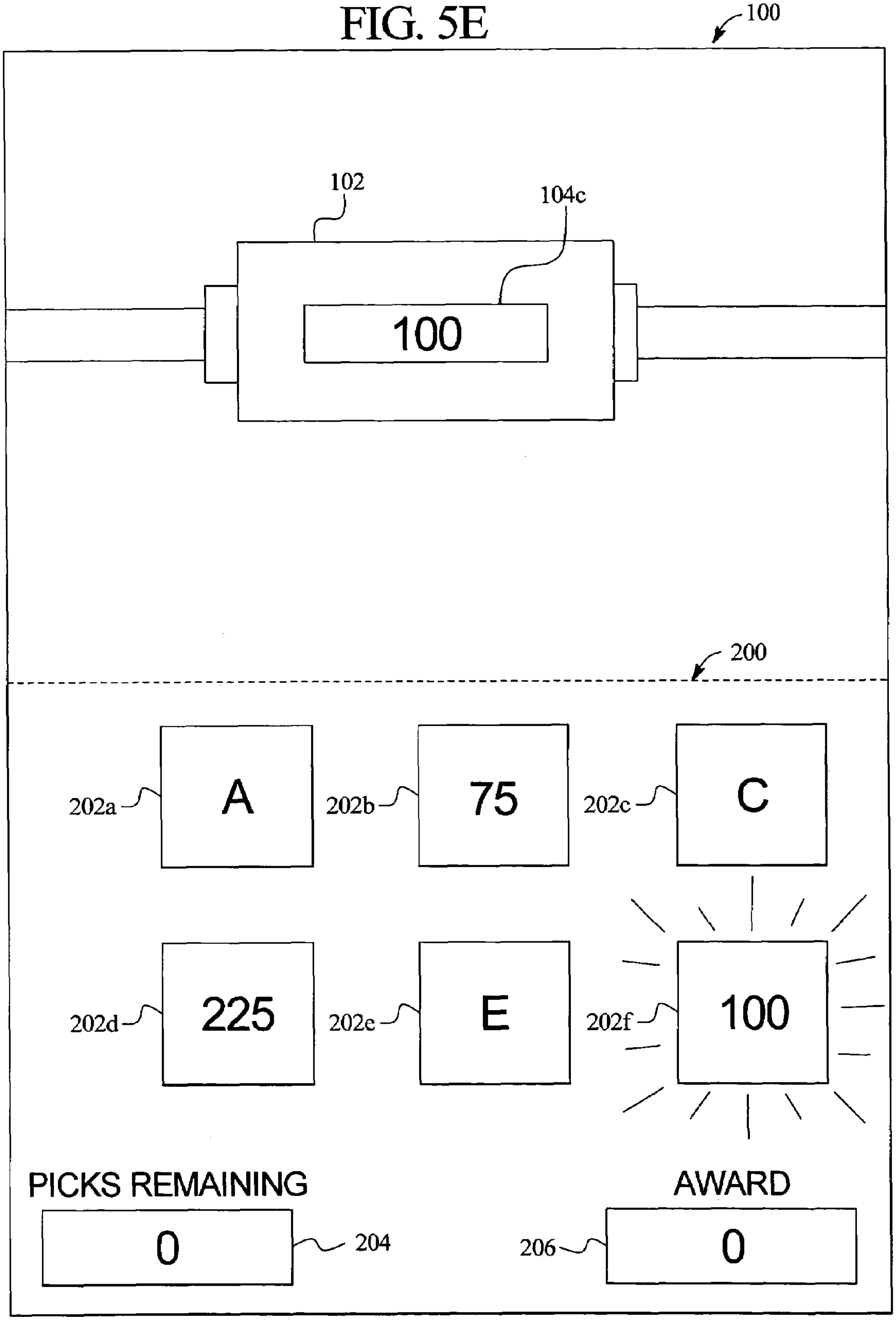

As illustrated in FIG. 5E, as described above, since the player has at least one pick of the selections remaining, the gaming device rotates the rotatable symbol display mechanism such that another individual symbol display member 104*c* is viewable by the player. After rotating the rotatable symbol display mechanism, the gaming device enables the player to pick another one of the selections and the award associated with the picked selection is revealed to the player. In this example, as illustrated in FIG. 5E, the player picked selection 202*f* and the gaming device revealed an award value of one-hundred associated with picked selection 202*f*. Accordingly, the revealed award value of one-hundred is associated with and displayed by one of individual symbol display members 104*c*.

After displaying the revealed award as one of the individual symbol display members, the gaming device again determines if at least one pick of the selections remains. Since no picks of the selections remain, the gaming device proceeds to the next phase or stage of the game. It should be appreciated that, as the award ultimately provided to the player is selected from the awards associated with the individual symbol display members, the player is enabled to select or form a set of potential awards during the player selection phase of the game.

Figure 5F:
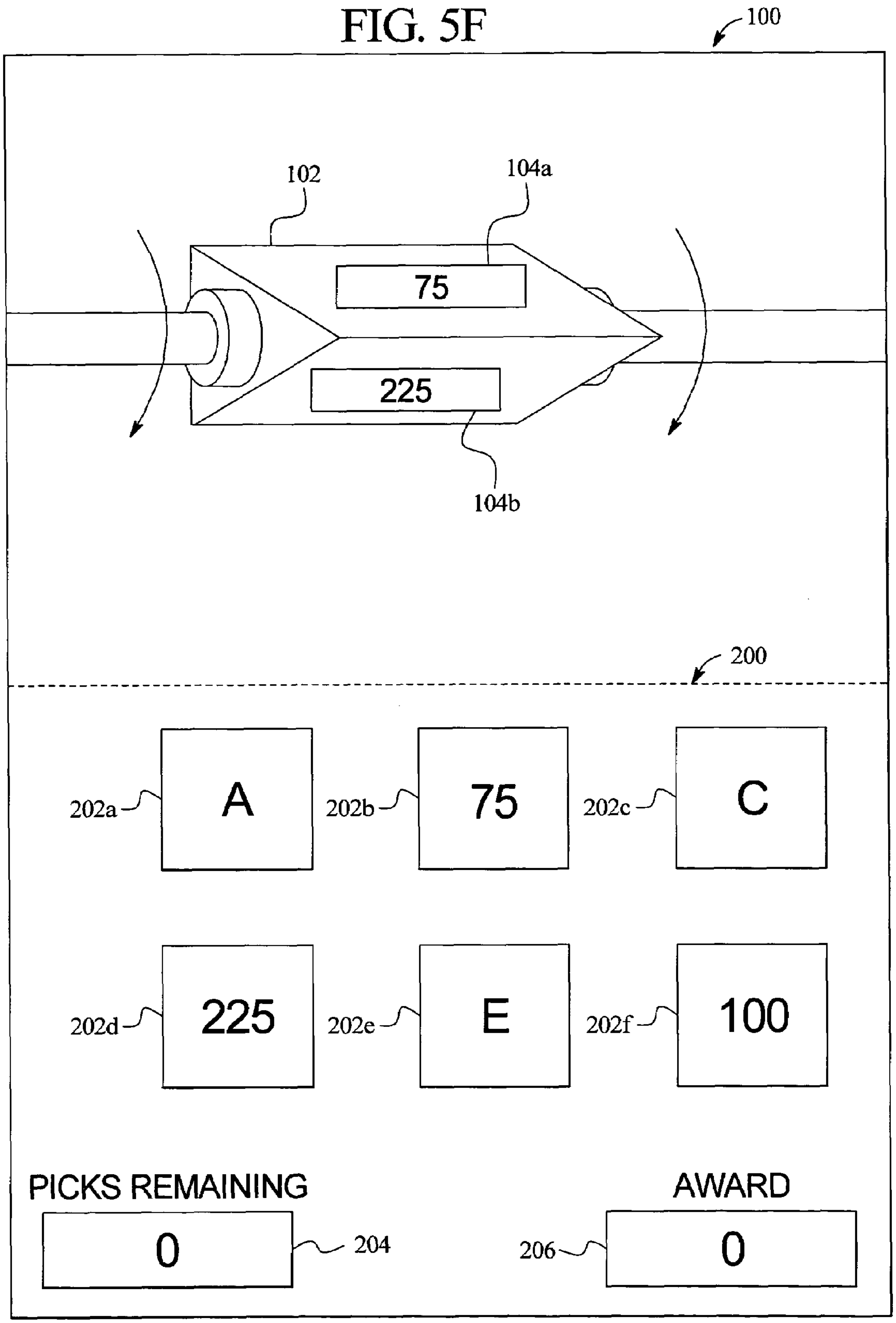
Figure 5G:
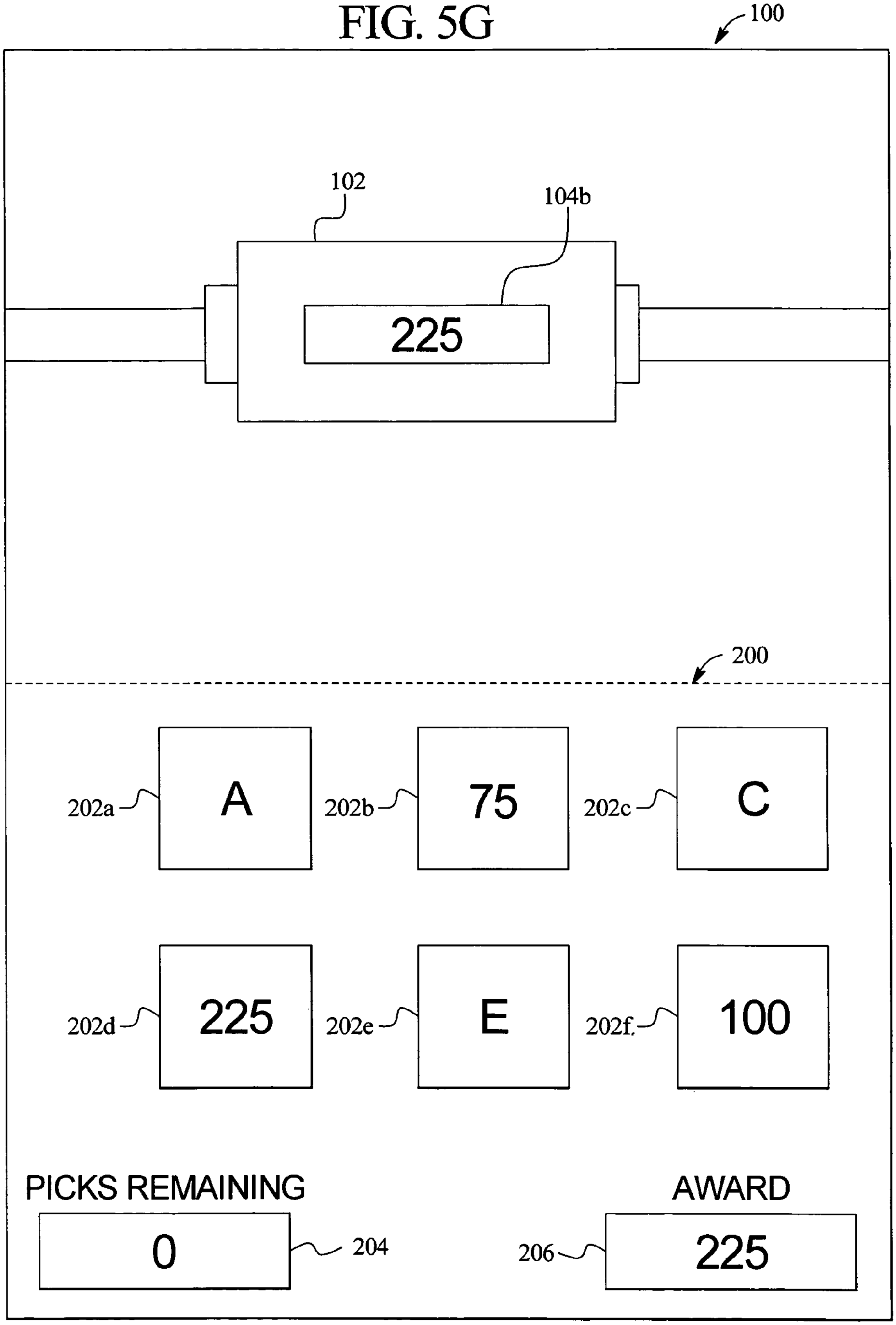

In the next phase of the game, as illustrated in FIG. 5F, the gaming device causes the rotatable symbol display mechanism to rotate. As described above, the rotatable symbol display mechanism is operable to rotate in a clockwise direction, a counter-clockwise direction or any suitable change of directions. The rotatable symbol display mechanism eventually stops rotating to indicate one of the individual symbol display members. The award or outcome associated with the indicated individual symbol display member is provided to the player, displayed in an award display 206 and the game ends. In this example, as illustrated in FIG. 5G, the rotatable symbol display mechanism stops rotating to indicate the individual symbol display member associated with the revealed award of two-hundred-twenty-five. Appropriate messages such as "YOUR AWARD IS 225" and "GAME OVER" may be provided to the player visually, or through suitable audio or audiovisual displays.

In one alternative embodiment of the present invention (not shown), as the rotatable symbol display mechanism is rotating, the gaming device provides a plurality of selectable symbols. Each symbol is associated with an award, in this example a multiplier, however, the award associated with each symbol is not initially displayed to the player. In this embodiment, the gaming device enables the player to pick one of the symbols. Upon picking one of the symbols, the award associated with that picked symbol is revealed to the player. The revealed multiplier will function to modify the award indicated by the award indicator. For example, if during the rotation of the symbol display mechanism, the player picks a symbol associated with a modifier of five, the indicated award of two-hundred-twenty-five is modified by the revealed modifier of five to form a total award of one-thousand-one-hundred-twenty-five. The total award is provided to the player and the game ends.

In an alternative embodiment, at least one selection is associated with a terminator of the selection phase of the game. In this embodiment, if the player picked selection is associated with a terminator, the gaming device terminates the selection phase and proceeds to the mechanical device award selection phase of the game. In one embodiment, if the player picked selection reveals a terminator and all of the individual symbol display members are not associated with and display an award, the gaming device randomly associates an award with each individual symbol display member that is not previously associated with an award. In another embodiment, if the player picked selection reveals a terminator and all of the individual symbol display members are not associated with and display an award, the gaming device does not associate any awards (or associates a consolation award) with the individual symbol display member that are not previously associated with an award. In this embodiment, if the symbol display mechanism indicates one of the individual symbol display members not associated with an award, the game ends and the player is not provided an award. In another embodiment, if the symbol display mechanism indicates one of the individual symbol display members not associated with an award, the gaming device re-rotates the symbol display mechanism until the symbol display mechanism indicates an individual symbol display member which is associated with an award.

In an alternative embodiment, if the player has at least one pick of the selections remaining and each of the individual symbol display members are already associated with and display an award, the gaming device is operable to reassociate the revealed award associated with the player's most recently picked selection with one or more of the individual symbol display members.

In another embodiment, the player is enabled to accept or reject each revealed award prior to that revealed award being associated with and displayed by at least one of the individual symbol display members. In this embodiment, the player is provided a designated number of rejections of revealed awards. In different embodiments, the designated number of rejections of revealed awards is predetermined, randomly determined, determined based on the player's wager in a primary game, determined from the occurrence of one or more symbols in a primary game or determined based on any other suitable method.

In one embodiment, as each award associated with a player picked selection is revealed, the gaming device determines if the player has at least one rejection of a revealed award remaining. If the player has at least one rejection of a revealed award remaining, the player is enabled to accept or reject the revealed award. If the player rejects the revealed award, the revealed award is not associated with and displayed by at least one of the individual symbol display members and the player is enabled to pick another one of the selections to reveal another award. If the player accepts the revealed award or the player has zero rejections of revealed awards remaining, as described above, the revealed award is associated with and displayed by at least one of the individual symbol display members.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operable under control of a processor, said gaming device comprising:

a cabinet;

a housing connected to the cabinet;

a display device supported by the cabinet;

a rotatable symbol display mechanism rotatably connected to the housing, said rotatable symbol display mechanism including a body which supports a static quantity of individual symbol display members which are spaced apart from each other, wherein at a first point in time each individual symbol display member is caused to display at least one of a plurality of different symbols, and at a second different point in time, each individual symbol display member is caused to display at least another, different one of the plurality of different symbols; and at least one memory device which stores a plurality of instructions, which when executed by the processor, cause the processor to operate with the display device, the rotatable symbol display mechanism and said static quantity plurality of individual symbol display members, for each play of a game, to:

(a) cause the display device to display a plurality of selections, wherein each of said plurality of selections is associated with one of the plurality of different symbols prior to any of said plurality of selections being picked;

(b) for each of the static quantity of individual symbol display members:

(i) enable a player to pick one of the displayed plurality of selections, and (ii) after enabling the player to pick one of the displayed plurality of selections, cause said individual symbol display member to display the symbol associated with the picked selection, wherein the symbol said individual symbol display member is caused to display is separate from any random determination of whether to display said symbol after said selection is picked by the player in association with said a play of the a game;

(c) after a triggering event occurs, cause the body of the rotatable symbol display mechanism to rotate to indicate one of the individual symbol display members; and (d) provide an award to the player, wherein the provided award is based on the symbol displayed by the indicated individual symbol display member of the rotated symbol display mechanism.

2. The gaming device of claim 1, wherein at least a portion of the housing includes a substantially transparent material.

3. The gaming device of claim 1, wherein the symbol displayed by a plurality of the static quantity of individual symbol display members are different.

4. The gaming device of claim 1, wherein the symbol displayed by each of the static quantity of individual symbol display members are different.

5. The gaming device of claim 1, wherein the rotatable symbol display mechanism includes a plate and a support having a first end and a second end, said first end being attached to the plate and said second end being movably connected to the housing.

6. The gaming device of claim 5, which includes an actuator coupled with the second end of the support.

7. The gaming device of claim 1, wherein the rotatable symbol display mechanism includes a sup disk having a fixed member and a moveable member, wherein the fixed member is connected to the housing and the moveable member is connected to the rotatable symbol display mechanism, and wherein the slip disk is operable to facilitate the transfer of electrical signals to the individual symbol display members and the symbol display mechanism to control the movement of the rotatable symbol display mechanism.

8. A gaming device operable under control of a processor, said gaming device comprising:

a cabinet;

an input device supported by the cabinet;

a display device supported by the cabinet;

a housing connected to the cabinet;

a rotatable symbol display mechanism rotatably connected to the housing, said rotatable symbol display mechanism including a body supporting a static quantity of individual symbol display members which are spaced apart from each other, each individual symbol display member configured to display at least two of a plurality of characteristics at two different points in time, wherein the rotatable symbol display mechanism is operable to rotate after a triggering event; and at least one memory device which stores a plurality of instructions, which when executed by the processor, cause the processor to operate with the input device, the display device, the rotatable symbol display mechanism and the individual symbol display members, for each play of a game, to:

(a) cause the display device to display a plurality of selections, wherein each of said plurality of selections is associated with one of a plurality of different symbols prior to any of said plurality of selections being picked, wherein each of said symbols is associated with at least one of the plurality of characteristics;

(b) for each of the static quantity of individual symbol display members:

(i) enable a player to pick one of the plurality of selections; and (ii) after the player is enabled to pick one of the plurality of selections; cause said individual symbol display member to display the characteristic associated with the symbol which is associated with the picked selection, wherein the displayed characteristic is separate from any random determination of whether to display said characteristic after the selection associated with the symbol associated with said characteristic is picked by the player for the play of the game;

(c) cause the rotatable symbol display mechanism to rotate about an axis relative to the housing to indicate one of the individual symbol display members; and (d) provide an award to the player based on the characteristic displayed on the indicated individual symbol display member.

9. The gaming device of claim 8, wherein at least a portion of the housing includes a substantially transparent material.

10. The gaming device of claim 8, wherein the characteristic displayed by a plurality of the static quantity of individual symbol display members are different.

11. The gaming device of claim 8, wherein the characteristic displayed by each of the static quantity of individual symbol display members are different.

12. The gaming device of claim 8, wherein the rotatable symbol display mechanism includes a plate and a support having a first end and a second end, said first end being attached to the plate and said second end being movably connected to the housing.

13. The gaming device of claim 12, which includes an actuator coupled with the second end of the support.

14. The gaming device of claim 8, wherein the rotatable symbol display mechanism includes a slip disk having a fixed member and a moveable member, wherein the fixed member is connected to the housing and the moveable member is connected to the rotatable symbol display mechanism, and wherein the slip disk is operable to facilitate the transfer of electrical signals to the individual symbol display members and the symbol display mechanism to control the movement of the rotatable symbol display mechanism.

15. A gaming device operable under control of a processor, said gaming device comprising:

a cabinet;

an input device supported by the cabinet; a housing connected to the cabinet;

a rotatable symbol display mechanism rotatably connected to the housing, said rotatable symbol display mechanism including a body which supports a static quantity of individual symbol display members which are spaced apart from each other;

a display device; and at least one memory device which stores a plurality of instructions, which when executed by the processor, cause the processor to operate with the input device, the rotatable symbol display mechanism and the display device to control each a play of a game by:

(a) causing the display device to display a plurality of selections, wherein each selection is associated with one of a plurality of different symbols prior to any of said plurality of selections being picked;

(b) enabling a player to pick one of said displayed plurality of selections;

(c) separate from any random determination of whether to display the symbol associated with the player picked selection, causing one of the static quantity of individual symbol display members to display and to associate the symbol associated with the player picked selection;

(d) determining if the static quantity of individual symbol display members are each associated with one of said symbols;

(e) if each of the static quantity of individual symbol display members are not associated with one of said symbols, repeating (b) to (d) until each of the static quantity of individual symbol display members is associated with one of said symbols; and (f) if each of the static quantity of individual symbol display members is associated with one of said symbols:

(i) causing the rotatable symbol display mechanism to rotate about an axis relative to the housing to sequentially indicate the individual symbol display members and then to indicate one of the static quantity of individual symbol display members, and (ii) providing any award to the player based on the symbol associated with the indicated individual symbol display member.

16. The gaming device of claim 15, wherein a plurality of the selections are each associated with different symbols.

17. The gaming device of claim 15, wherein a plurality of the selections are each associated with the same symbols.

18. The gaming device of claim 15, wherein each of the selections are associated with different symbols.

19. The gaming device of claim 15, which includes a plurality of modifiers.

20. The gaming device of claim 19, wherein the processor is operable to control the play of the game by enabling the player to pick one of the modifiers and modifying the award based on the picked modifier.

21. A method of operating a gaming device for each play of a game, said method comprising:

(a) causing one of a plurality of selections to be picked, wherein each selection is associated with one of a plurality of different symbols prior to any of said plurality of selections being picked;

(b) causing each of a static quantity of individual symbol display members to display one of the plurality of symbols, wherein the individual symbol display members are spaced apart from each other and each of the static quantity of individual symbol display members is configured to display at least two of the symbols at two different points in time, wherein the symbol each of the static quantity of individual symbol display members displays is based on at least one of the symbols associated with at least one of the picked selections, wherein each of the static quantity of individual symbol display members is supported by a body of a rotatable symbol display mechanism that is rotatably connected to a housing of the gaming device;

(c) causing the rotatable symbol display mechanism to rotate about an axis relative to the housing to indicate one of the static quantities of individual symbol display members; and (d) providing an award to a player based on the symbol displayed on the indicated individual symbol display member, wherein the symbol displayed is: (i) displayed separate from any random determination of whether to display said symbol after said selection is picked for the play of said game; and (ii) based on at least one of the symbols associated with at least one of the player picked selections.

22. A method of operating a gaming device for each play of a game, said method comprising:

(a) enabling a player to pick one of a plurality of selections, wherein each of said selections is associated with one of a plurality of symbols prior to any of said plurality of selections being picked;
(b) separate from any random determination of whether to display the symbol associated with the player picked selection after said selection is picked by the player for the play of said game, displaying and associating the symbol associated with the player picked selection with one of a static quantity of individual symbol display members, wherein each of the static quantity of individual symbol display members is connected to a rotatable symbol display mechanism that is rotatably connected to a housing;
(c) determining if the static quantity of individual symbol display members are each associated with one of said symbols;
(d) if the static quantity of individual symbol display members are not associated with one of said symbols, repeating (a) to (c) until the static quantity of individual symbol display members are each associated with one of said symbols; and
(e) if the static quantity of individual symbol display members are each associated with one of said symbols:
(i) causing the rotatable symbol display mechanism to rotate about an axis relative to the housing to indicate one of the individual symbol display members, and (ii) providing any award to the player based on the symbol associated with the indicated individual symbol display member.

23. A gaming system comprising:
a cabinet;
at least one display device connected to the cabinet;
at least one input device connected to the cabinet;
a housing connected to the cabinet; and
a rotatable symbol display mechanism rotatably connected to the housing, said rotatable symbol display mechanism including a body which supports a static quantity of individual symbol display members which are spaced apart from each other;
at least one processor; and
at least one memory device which stores a plurality of instructions, which when executed by the at least one processor, cause the at least one processor to operate with the at least one display device, the at least one input device and the rotatable symbol display mechanism, for each play of a game, to:
(a) enable a player to place a wager to play said game;
(b) enable the player to make at least one input using the at least one input device, wherein said at least one input is made in association with the play of the game;
(c) cause one of said static quantity of individual symbol display members to display at least one symbol, wherein said symbol displayed by the individual symbol display member is: (i) displayed separate from any random determination of whether to display said symbol after said at least one input is made by the player in association with the play of the game; (ii) based on said at least one input made by the player in association with the play of the game; and (iii) associated with said at least one input prior to enabling the player to make said at least one input, and said static quantity of individual symbol display members are configured to display at least two different symbols at two different points in time;
(d) determine if the static quantity of said individual symbol display members are each caused to display at least one symbol;
(e) if less than each of the static quantity of said individual symbol display members are caused to display at least one symbol, repeat (b) to (d) until each of the static quantity of individual symbol display members is caused to display at least one symbol; and
(f) if each of the static quantity of said individual symbol display members are caused to display at least one symbol:
(i) cause the rotatable symbol display mechanism to rotate about an axis relative to the housing to sequentially indicate the static quantity of individual symbol display members and then to indicate one of the static quantity of individual symbol display members,
(ii) cause the at least one display device to display any award to the player based on the symbol displayed by the indicated individual symbol display member; and
(iii) provide any displayed award to the player.

24. The gaming system of claim 23, wherein the symbol caused to be displayed by a plurality of the static quantity of individual symbol display members are different.

25. A method of operating a gaming system for each play of a game, said method comprising:
(a) enabling a player to place a wager to play the game;
(b) enabling the player to make at least one input in association with the play of the game;
(c) causing one of a static quantity of individual symbol display members to display at least one symbol, wherein said symbol displayed by the individual symbol display member is: (i) displayed separate from any random determination of whether to display said symbol after said input is made by the player for the play of the game; and (ii) based on said at least one input made by the player in association with the play of the game, wherein said displayed symbol is associated with said at least one input prior to enabling the player to make said at least one input, said static quantity of spaced apart individual symbol display members are each configured to display at least two different symbols at two different points in time, said individual symbol display members are spaced apart from each other and said static quantity of individual symbol display members are each connected to a rotatable symbol display mechanism;
(d) determining if said static quantity of individual symbol display members are each caused to display at least one symbol;
(e) if less than each of the static quantity of said individual symbol display members are caused to display at least one symbol, repeating (b) to (d) until each of the static quantity of individual symbol display members is caused to display at least one symbol; and
(f) if each of the static quantity of said individual symbol display members are caused to display at least one symbol:
(i) causing the rotatable symbol display mechanism to rotate about an axis to sequentially indicate the static quantity individual symbol display members and then to indicate one of the static quantity of individual symbol display members, and
(ii) displaying and providing any award to the player based on the symbol displayed by the indicated individual symbol display member.

26. The method of claim 25, wherein the symbol caused to be displayed by a plurality of the static quantity of individual symbol display members are different.

* * * * *